United States Patent
Aitcin

(10) Patent No.: US 9,267,580 B2
(45) Date of Patent: Feb. 23, 2016

(54) CONTINUOUSLY VARIABLE TRANSMISSION DRIVE PULLEY

(75) Inventor: Xavier-Pierre Aitcin, St-Hyacinthe (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 0 days.

(21) Appl. No.: 14/241,533

(22) PCT Filed: Aug. 31, 2011

(86) PCT No.: PCT/US2011/049938
§ 371 (c)(1),
(2), (4) Date: Feb. 27, 2014

(87) PCT Pub. No.: WO2013/032463
PCT Pub. Date: Mar. 7, 2013

(65) Prior Publication Data
US 2014/0349792 A1   Nov. 27, 2014

(51) Int. Cl.
*F16H 59/00* (2006.01)
*F16H 61/00* (2006.01)
*F16H 63/00* (2006.01)
*F16H 9/12* (2006.01)
(Continued)

(52) U.S. Cl.
CPC .............. *F16H 9/125* (2013.01); *F16H 55/563* (2013.01); *F16H 63/067* (2013.01); *B60Y 2200/252* (2013.01)

(58) Field of Classification Search
CPC . F16H 55/563; F16H 61/66245; F16H 55/56; F16H 63/067; F16H 9/12
USPC ............................................................ 474/14
See application file for complete search history.

(56) References Cited

U.S. PATENT DOCUMENTS

| 2,317,339 A | * | 4/1943 | Steven ............................ 474/14 |
| 3,597,987 A | * | 8/1971 | Kiekhaefer ...................... 474/14 |
| 3,727,478 A | * | 4/1973 | Erickson et al. ................ 474/14 |

(Continued)

FOREIGN PATENT DOCUMENTS

| CN | 1833123 A | 9/2006 |
| EP | 1903257 A2 | 3/2008 |

(Continued)

OTHER PUBLICATIONS

International Search Report of PCT/US2011/049938, Jan. 31, 2012, Blaine R. Copenheaver.

(Continued)

*Primary Examiner* — Henry Liu
(74) *Attorney, Agent, or Firm* — BCF LLP

(57) ABSTRACT

A drive pulley for a continuously variable transmission includes a fixed sheave and a movable sheave rotationally fixed relative to the fixed sheave. A housing is axially and rotationally fixed relative to the fixed sheave. At least one centrifugal actuator includes an arm pivotally connected to one of the movable sheave and the housing of the fixed sheave at a first pivot axis. The arm pivots away from the one of the movable sheave and the housing about the first pivot axis as a speed of rotation of the drive pulley increases and pushes against another one of the movable sheave and the housing thereby moving the movable sheave axially toward the fixed sheave. The arm is movable relative to the first pivot axis by pivoting the at least one arm about a second pivot axis. The second pivot axis is offset from the first pivot axis.

33 Claims, 14 Drawing Sheets

(51) Int. Cl.
*F16H 63/06* (2006.01)
*F16H 55/56* (2006.01)

(56) References Cited

U.S. PATENT DOCUMENTS

| | | | | |
|---|---|---|---|---|
| 3,733,918 | A * | 5/1973 | Domaas | 474/14 |
| 3,777,583 | A * | 12/1973 | Talbot | 474/14 |
| RE27,858 | E * | 1/1974 | Laughlin | 474/14 |
| 3,939,720 | A * | 2/1976 | Aaen et al. | 474/14 |
| 3,958,461 | A * | 5/1976 | Aaen et al. | 474/14 |
| 3,961,539 | A * | 6/1976 | Tremblay et al. | 474/14 |
| 3,996,811 | A | 12/1976 | Reese | |
| 4,095,479 | A | 6/1978 | Lundberg | |
| 4,229,989 | A * | 10/1980 | Tamura | 474/12 |
| 4,432,743 | A * | 2/1984 | Pitoiset | 474/14 |
| 4,575,363 | A * | 3/1986 | Burgess et al. | 474/14 |
| 4,813,914 | A | 3/1989 | Mott | |
| 4,826,467 | A | 5/1989 | Reese et al. | |
| 5,209,703 | A * | 5/1993 | Mastine et al. | 474/14 |
| 5,326,330 | A * | 7/1994 | Bostelmann | 474/13 |
| 5,421,784 | A * | 6/1995 | Robert | 474/13 |
| 5,562,555 | A * | 10/1996 | Peterson | 474/14 |
| 5,597,060 | A * | 1/1997 | Huddleston et al. | 192/105 C |
| 5,647,810 | A * | 7/1997 | Huddleston | 474/14 |
| 5,692,982 | A * | 12/1997 | Peterson | 474/10 |
| 5,692,983 | A * | 12/1997 | Bostelmann | 474/14 |
| 5,725,281 | A | 3/1998 | Vajrinen | |
| 5,795,255 | A * | 8/1998 | Hooper | 474/14 |
| 5,797,816 | A * | 8/1998 | Bostelmann | 474/14 |
| 6,071,210 | A * | 6/2000 | Kato et al. | 476/42 |
| 6,309,317 | B1 * | 10/2001 | Joss | 474/13 |
| 6,346,056 | B1 * | 2/2002 | Nouis et al. | 474/14 |
| 6,958,024 | B2 * | 10/2005 | Takano | 474/14 |
| 7,726,927 | B2 * | 6/2010 | Cook | 411/398 |
| 7,901,308 | B2 | 3/2011 | Binello et al. | |
| 2002/0032088 | A1 * | 3/2002 | Korenjak et al. | 474/14 |
| 2002/0119846 | A1 | 8/2002 | Kitai et al. | |
| 2002/0123400 | A1 * | 9/2002 | Younggren et al. | 474/14 |
| 2002/0142870 | A1 * | 10/2002 | Okano et al. | 474/28 |
| 2004/0110583 | A1 * | 6/2004 | Liang | 474/14 |
| 2004/0214668 | A1 * | 10/2004 | Takano | 474/14 |
| 2008/0173492 | A1 * | 7/2008 | Aitcin et al. | 180/190 |
| 2009/0116770 | A1 | 5/2009 | Watanabe et al. | |
| 2009/0227404 | A1 * | 9/2009 | Beyer | 474/14 |
| 2011/0092325 | A1 * | 4/2011 | Vuksa et al. | 474/14 |
| 2012/0214626 | A1 * | 8/2012 | Cook | 474/14 |

FOREIGN PATENT DOCUMENTS

| | | |
|---|---|---|
| JP | 5940061 | 3/1984 |
| RU | 2100950 C1 | 1/1998 |
| RU | 2176699 C2 | 12/2001 |

OTHER PUBLICATIONS

English Abstract of JPS5940061, Published Mar. 5, 1984; Retrieved from the Internet: URL:http://worlwide.espacenet.com on Sep. 11, 2013.

* cited by examiner

CONTINUOUSLY VARIABLE TRANSMISSION DRIVE PULLEY

TECHNICAL FIELD

The present invention relates to drive pulleys and centrifugal actuators for continuously variable transmissions.

BACKGROUND

Conventional snowmobile drive trains incorporate a continuously variable transmission (CVT) having a drive pulley that is operatively coupled to the engine crankshaft' and a driven pulley coupled to a driven shaft. The drive pulley transfers torque to the driven pulley via a drive belt looped around both pulleys. Typically, the driven shaft is a transverse jackshaft which drives the input member of a chain and sprocket reduction drive. The output of reduction drive is coupled to one end of an axle on which are located the drive track drive sprocket wheels.

The drive pulley includes a centrifugal actuator through which the drive ratio of the drive pulley is varied progressively as a function of the engine speed. The centrifugal actuator is connected to a movable sheave of the drive pulley. The drive pulley also includes a fixed sheave which is axially fixed. The fixed shave and the movable sheaves are rotatable together. The movable sheave is movable axially toward the fixed sheave by the action of the centrifugal actuator and away from the fixed sheave by a biasing spring. The centrifugal actuator generally consists of centrifugal weights in the form of adjusting arms. Each of the arms is connected to the movable sheave of the drive pulley by a pin, and pivots outwards about its corresponding pin. As they pivot, the arms are in contact with corresponding rollers disposed on a housing fixed relative to the fixed sheave. Surfaces of the arms in contact with the rollers are cam surfaces and the corresponding rollers are the followers of the cam surface.

When the adjusting arms pivot outwards as a result of centrifugal force, they slide against their corresponding roller and the axially movable sheave is pushed towards the fixed sheave. The axial position of the movable sheave thus depends on the angle at which the adjusting arms are pivoted, which in turn is determined by the mass and by the shape of the rolling track for the rollers on the adjusting arms, the speed of rotation of the pulley and the biasing spring characteristics. The desired interaction between the axial movement of the movable sheave and the rotational speed drive pulley is adjustable to compensate for different engines and/or operating conditions, for example when the vehicle is being operated at an altitude different from the one for which the drive pulley was originally calibrated.

There are currently several ways to adjust the interaction between the axial movement of the movable sheave and the rotational speed of the drive pulley using the adjusting arms.

One such way is described in U.S. Pat. No. 5,326,330. An adjustable eccentric member is disposed between each arm and its associated pivot point. The eccentric member is angularly adjustable to effect variations in the position of the arm relative to the pivot point. Adjusting the eccentric member alters both the position of the center of gravity of the arm with respect to the pivot point and the initial (i.e. at rest) position of the cam surface in relation to the roller.

In other actuators, such as that shown in U.S. Pat. No. 6,346,056, small weights in the form of screws are added to the arms so as to make the arms heavier and change the position of their center of gravity.

Yet another way to adjust the interaction between the axial movement of the movable sheave and the rotational speed of the drive pulley is described in U.S. Pat. No. 5,209,703. The followers have a surface with a given shape that is in contact with the arms. The followers, instead of the arms, are adjustably pivoted about their respective pivot points via one of two types of adjustments. The first type of adjustment is by pushing a pin on the followers. The pin is disposed offset of the pivot point of the followers. A translation of the pin results in change in position of the followers about their pivot point. The second type of adjustment is by using an eccentric, whereby rotating the eccentric, changes a position of the arm.

While the current drive pulleys and their adjustable mechanisms provide adequate adjustments, some of the consequences of the interaction between the axial movement of the movable sheave and the rotational speed of the drive pulley can be sometimes undesirable. FIG. 13A illustrates the force profile of an arm adjusted to several different positions. The force profile is the centrifugal force needed to lift the arm as a function of travel distance of the moveable sheave for a centrifugal actuator similar to the one disclosed in U.S. Pat. No. 5,326,330. As shown, different positions of the arms alter the force profile after zero (0) travel, which is normally the desired outcome of such an adjustment. However, the force needed to initiate the movement of the moveable sheave is also different between the different adjustment positions of the arm. A higher force needed to initiate the movement of the moveable sheave induces that the drive pulley has to be rotated at a higher speed, and as a consequence the driver has to press harder on the throttle lever. Altering the engagement speed can be in certain circumstances inconvenient to the user. The user typically becomes accustomed to a certain position of the throttle lever when initiating moving of the vehicle and normally desires for it to remain unchanged.

Therefore, there is a need for a drive pulley having a centrifugal actuator being easy to adjust. There is also a need for a centrifugal actuator that would minimally alter the engagement speed when being adjusted.

SUMMARY

It is an object of the present to ameliorate at least some of the inconveniences present in the prior art.

In one aspect, the present provides a drive pulley for a continuously variable transmission. The drive pulley comprises a fixed sheave and a movable sheave axially movable relative to the fixed sheave. The movable sheave is rotationally fixed relative to the fixed sheave. A housing is axially and rotationally fixed relative to the fixed sheave. The movable sheave is disposed axially between the housing and the fixed sheave. A biasing member is biasing the movable sheave axially away from the fixed sheave. At least one centrifugal actuator includes an arm pivotally connected to one of the movable sheave and the housing at a first pivot axis. The arm is pivoting away from the one of the movable sheave and the housing about the first pivot axis as a speed of rotation of the drive pulley increases. The arm is pushing against another one of the movable sheave and the housing as the arm pivots away from the one of the movable sheave and the housing, thereby moving the movable sheave axially toward the fixed sheave. The arm is movable relative to the first pivot axis by pivoting the arm about a second pivot axis. The second pivot axis is offset from the first pivot axis.

In an additional aspect, the second pivot axis is disposed in the arm.

In a further aspect, the at least one centrifugal actuator further includes an eccentric disposed in an aperture of the arm. The eccentric is pivotable about the first pivot axis relative to the arm.

In an additional aspect, the arm includes a first aperture and a second aperture. The first pivot axis passes through the first aperture, and the second pivot axis passes through the second aperture.

In a further aspect, the first aperture is oblong and adapted to cooperate with an eccentric disposed in the first aperture. The eccentric is pivotable about the first pivot axis relative to the arm.

In an additional aspect, the at least one centrifugal actuator further includes an indexing member connected to the eccentric. The indexing member is controlling the pivoting of the arm about the second pivot axis by pivoting the eccentric about the first pivot axis.

In a further aspect, the at least one centrifugal actuator further includes a locking member. The locking member is selectively preventing the eccentric from rotating relative to the arm.

In an additional aspect, a fastener is securing the locking member, the indexing member and the arm together.

In a further aspect, the second pivot axis is disposed at a center of gravity of the at least one centrifugal actuator.

In another aspect, the present provides an arm for a centrifugal adjustment system of a drive pulley for a continuously variable transmission. The arm comprises a body having a head portion, a tail portion and a shoulder separating the head portion form the tail portion. A first aperture is disposed in the head portion. A second aperture is disposed in the tail portion.

In a further aspect, the first aperture is oblong.

In an additional aspect, the head portion has a first thickness. The tail portion has a second thickness. The first thickness is smaller than the second thickness.

In a further aspect, the second aperture is smaller than the first aperture.

In yet another aspect, the present provides a drive pulley for a continuously variable transmission. The drive pulley comprises a fixed sheave and a movable sheave axially movable relative to the fixed sheave. The movable sheave is rotationally fixed relative to the fixed sheave. A biasing member is biasing the movable sheave axially away from the fixed sheave. At least one centrifugal actuator includes an arm pivotally connected to one of the movable sheave and a portion of the drive pulley axially and rotationally fixed to the fixed sheave at a first pivot axis. The arm has an associated cam surface. At least one follower is associated with the cam surface of the at least one centrifugal actuator. The at least one follower is connected to the other one of the movable sheave and the portion of the drive pulley. The arm of the at least one centrifugal actuator is pivoting about the first pivot axis as a speed of rotation of the drive pulley increases. The cam surface of the at least one centrifugal actuator is pushing against the at least one follower as the, cam surface pivots about the first pivot axis thereby moving the movable sheave axially toward the fixed sheave. The arm of the at least one centrifugal actuator is movable relative to the first pivot axis by pivoting the arm about a second pivot axis. The second pivot axis is offset from the first pivot axis.

In an additional aspect, the second pivot axis is disposed in the arm of the at least one centrifugal actuator.

In a further aspect, the at least one centrifugal actuator further includes an eccentric disposed in an aperture of the arm. The eccentric is pivotable about the first pivot axis relative to the arm.

In an additional aspect, the portion of the drive pulley is a housing axially and rotationally fixed to the fixed sheave.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present drive pulley for a continuously variable transmission (CVT) will be described with respect to a snowmobile. However, it is contemplated that the drive pulley could be used in a CVT for other vehicles, such as, but not limited to, a motorcycle, a scooter, a three-wheel road vehicle and an all-terrain vehicle (ATV).

Figure 1:
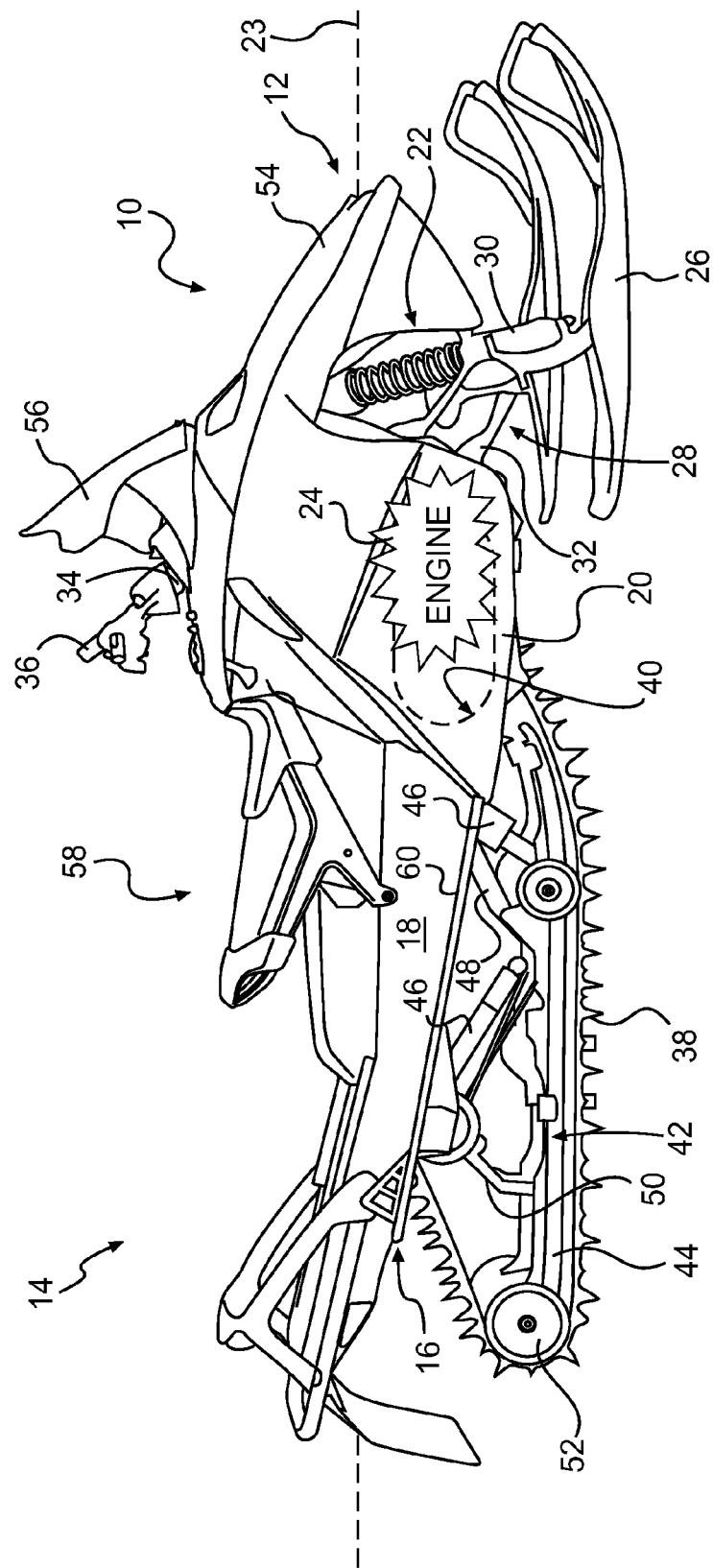
FIG. 1 is a right side elevation view of a snowmobile.

Turning now to FIG. 1, a snowmobile 10 includes a forward end 12 and a rearward end 14 which are defined consistently with a forward travel direction of the vehicle. The snowmobile 10 includes a frame 16 which normally includes a tunnel 18, an engine cradle portion 20 and a front suspension assembly portion 22. The tunnel 18 generally consists of sheet metal bent in an inverted U-shape which extends rearwardly along the longitudinal axis 23 of the snowmobile 10 and is connected at the front to the engine cradle portion 20. An internal combustion engine 24, which is schematically illustrated in FIG. 1, is carried by the engine cradle portion 20 of the frame 16. It is contemplated that the engine 24 could be replaced by an electric motor or an electric/internal combustion hybrid engine. A steering assembly is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively connecting the respective skis 26 to a steering column 34. A steering device in the form of handlebar 36, positioned forward of a rider, is attached to the upper end of the steering column 34 to allow the rider to rotate the ski legs 30 and thus the skis 26, in order to steer the snowmobile 10.

An endless drive track 38 is positioned at the rearward end 14 of the snowmobile 10. The drive track 38 is disposed generally under the tunnel 18, and is operatively connected to the engine 24 through CVT 40 illustrated schematically by broken lines and which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding the shock absorbers 46. Suspension arms 48 and 50 are provided to attach the slide rails 44 to the frame 16. One or more idler wheels 52 are also provided in the rear suspension assembly 42.

At the forward end 12 of the snowmobile 10, fairings 54 enclose the engine 24 and the CVT 40, thereby providing an external shell that protects the engine 24 and the CVT 40. The fairings 54 include a hood and one or more side panels which can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the rider while the snowmobile 10 is moving.

The engine 24 is an internal combustion engine that is supported on the frame 16 and is located at the engine cradle portion 20. The internal construction of the engine 24 may be of any known type and can operate on the two-stroke or four-stroke principle. The engine 24 drives a crankshaft 25 (FIG. 7) that rotates about a horizontally disposed axis that extends generally transversely to the longitudinal axis 23 of the snowmobile 10. The crankshaft 25 drives the CVT 40 for transmitting torque to the endless drive track 38 for propulsion of the snowmobile 10 as described in greater detail below.

A straddle-type seat 58 is positioned atop the frame 16. A rear portion of the seat 58 may include a storage compartment or can be used to accommodate a passenger seat. Two footrests 60 are positioned on opposite sides of the snowmobile 10 below the seat 58 to accommodate the driver's feet.

Figure 2:
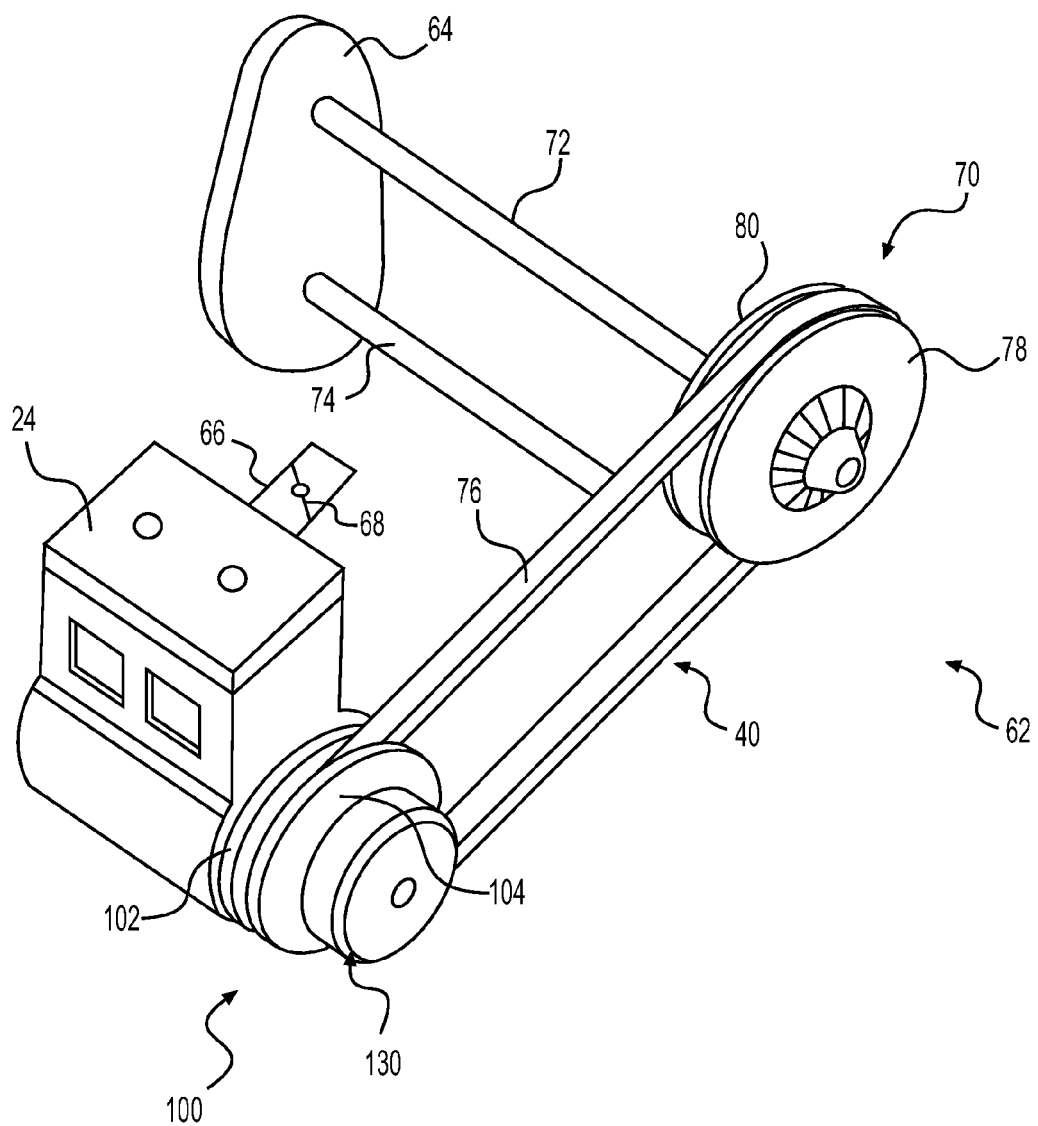
FIG. 2 is schematic representation of a perspective view, taken from a front, left side, of a powertrain of the snowmobile of FIG. 1.
Figure 3:
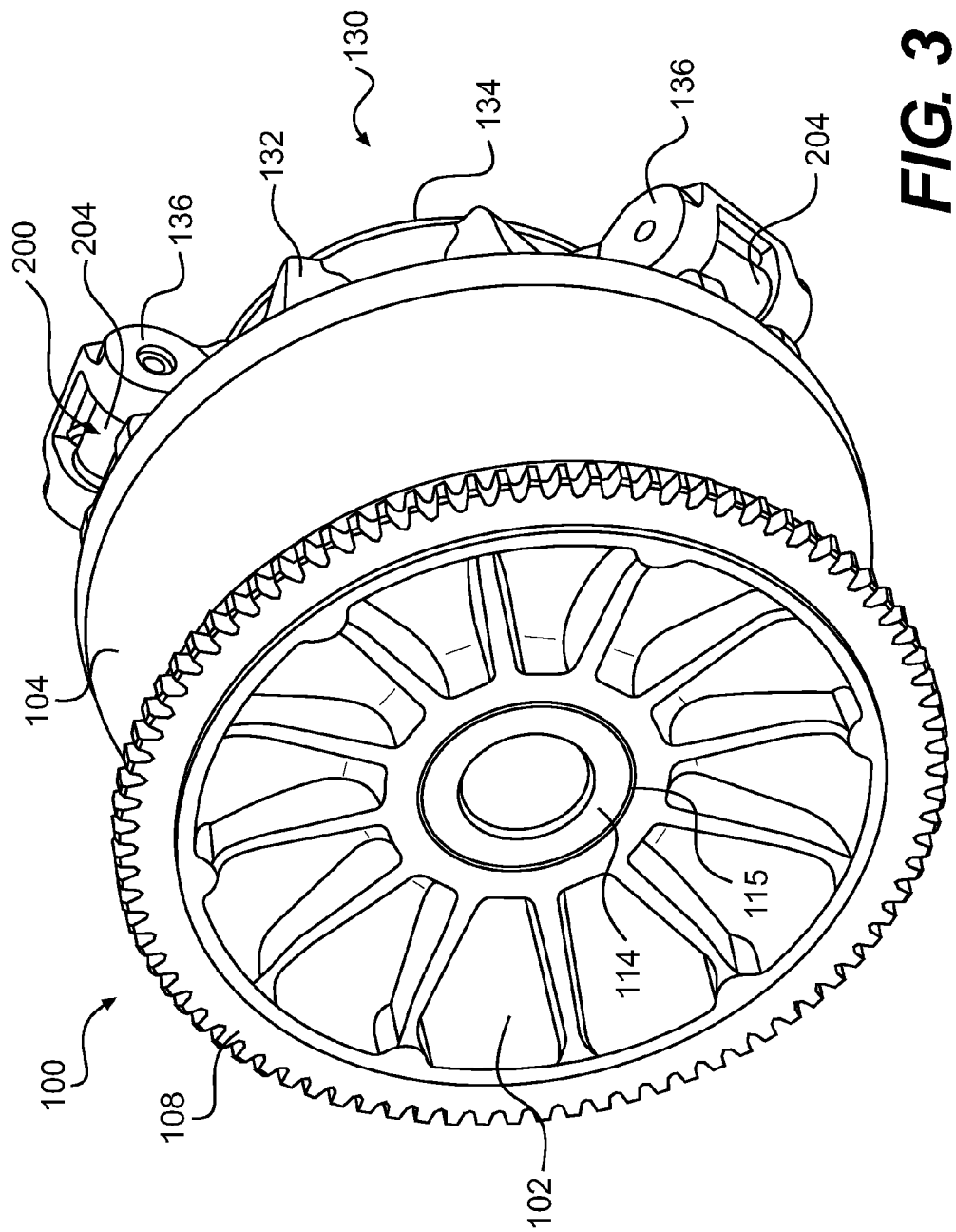
FIG. 3 is a perspective view, taken from a right side, of a first embodiment of a drive pulley of a CVT of the powertrain of FIG. 2.
Figure 4:
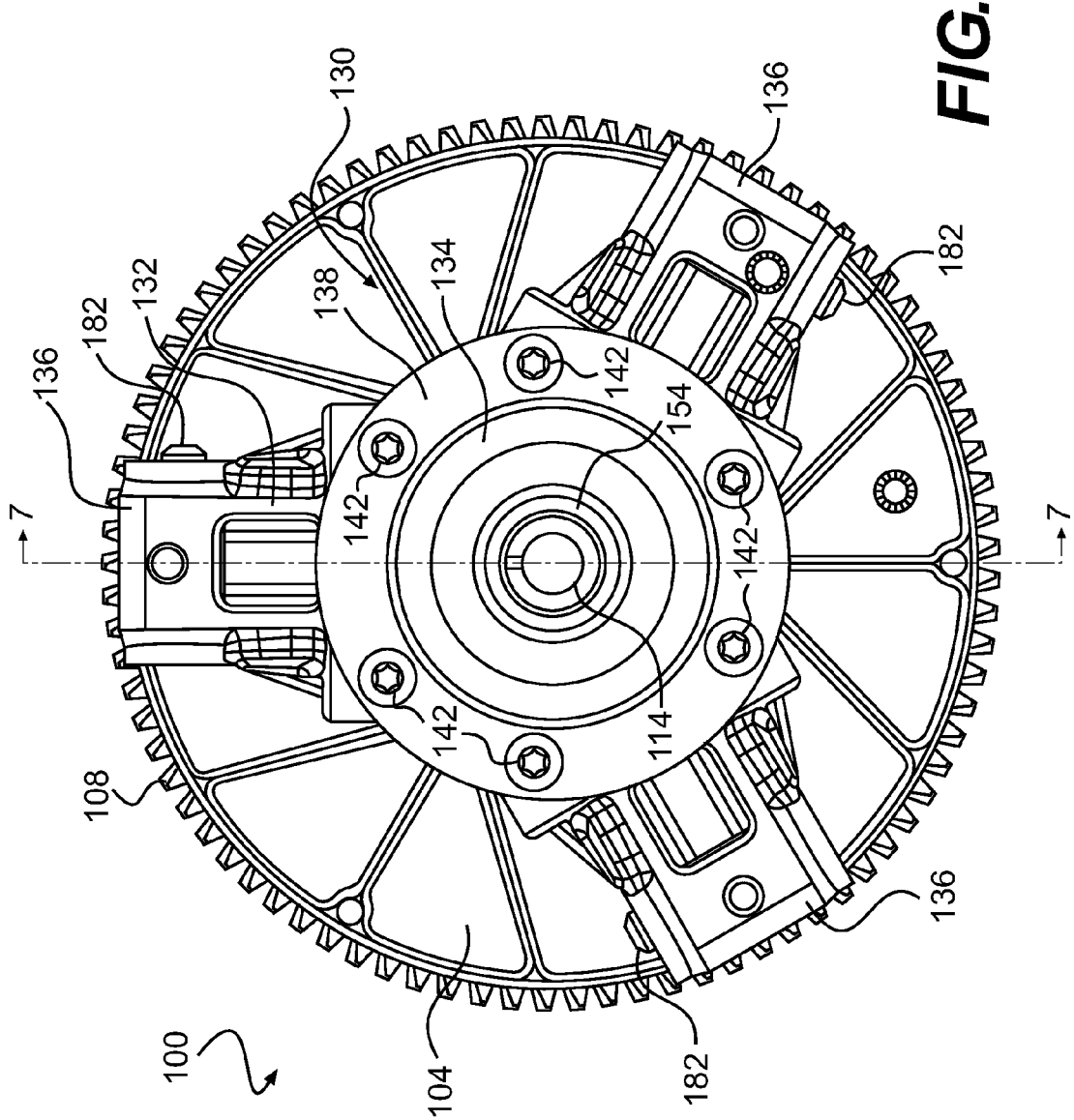
FIG. 4 is a left side elevation view of the drive pulley of FIG. 3.
Figure 5:
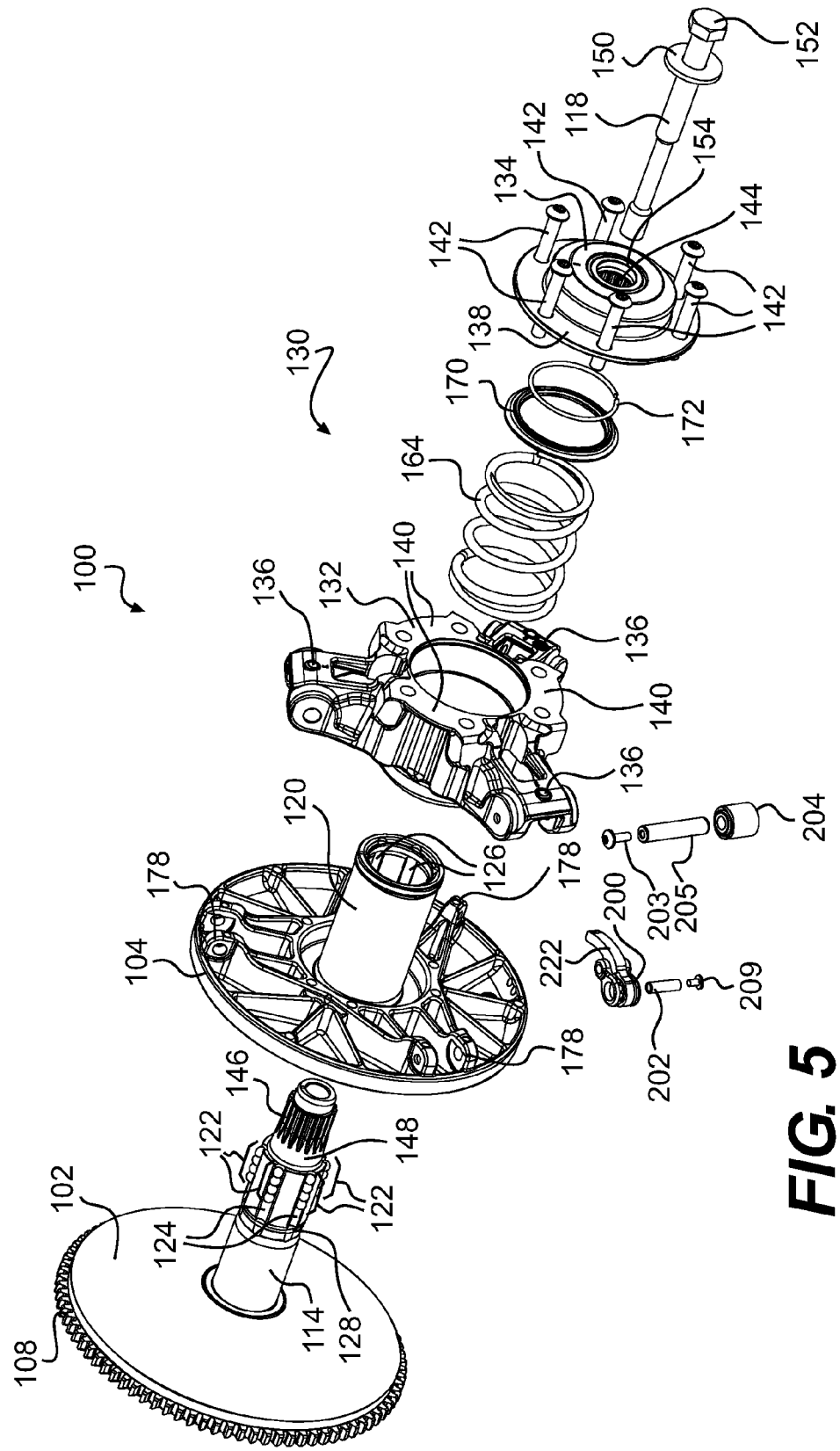
FIG. 5 is an exploded view of the drive pulley of FIG. 3, with some of the elements omitted for clarity.

FIG. 2 illustrates schematically a powertrain 62 of the snowmobile 10. The powertrain 62 includes the engine 24, the CVT 40 and a fixed ratio reduction drive 64. A throttle body 66 having a throttle valve 68 therein is connected to air intake ports of the engine 24 to control the flow of air to the engine 24. It is contemplated that the throttle body 66 could be replaced by a carburetor. The CVT 40 includes a drive pulley 100 coupled to the crankshaft 25 to rotate with the crankshaft 25 of the engine 24 and a driven pulley 70 coupled to one end of a transversely mounted jackshaft 72 which is supported on the frame 16 through bearings. As illustrated, the transversely mounted jackshaft 72 traverses the width of the engine 24. The opposite end of the transversely mounted jackshaft 72 is connected to the input member of the reduction drive 64 and the output member of the reduction drive 64 is connected to a drive axle 74 carrying sprocket wheels (not shown) that form a driving connection with the drive track 38.

The drive pulley 100 of the CVT 40 includes a pair of opposed frustoconical belt drive sheaves 102 and 104 between which the drive belt 76 is located. The drive belt 76 is made of rubber, but it is contemplated that it could be made of metal linkages. The drive pulley 100 will be described in greater detail below. The driven pulley 70 includes a pair of frustoconical belt drive sheaves 78 and 80 between which the drive belt 76 is located. As can be seen, the drive belt 76 is looped around both the drive pulley 100 and the driven pulley 70. The torque being transmitted to the driven pulley 70 provides the necessary clamping force on the drive belt 76 through its torque sensitive mechanical device in order to efficiently transfer torque to the further powertrain components. The effective diameters of the drive pulley 100 and the driven pulley 70 are the result of the equilibrium of forces on the drive belt 76 from three centrifugal actuators 200 (or centrifugal adjustment systems) of the drive pulley 100 and the torque sensitive mechanism of the driven pulley 70. The centrifugal actuators 200 will be described in greater detail below.

In this particular example, the drive pulley 100 rotates at the same speed as the crankshaft 25 of the engine 24 whereas the speed of rotation of the transversely mounted jackshaft 72 is determined in accordance with the instantaneous ratio of the CVT 40, and the drive axle 74 rotates at a lower speed than the transversely mounted jackshaft 72 because of the action of the reduction drive 64. Typically, the input member of the reduction drive 64 consists of a small sprocket connected to the transversely mounted jackshaft 72 and coupled to drive an output member consisting of a larger sprocket connected to the drive axle 74 through a driving chain, all enclosed within the housing of the reduction drive 64.

It is contemplated that the drive pulley 100 could be coupled to an engine shaft other than the crankshaft 25, such as an output shaft, a counterbalance shaft, or a power take-off shaft driven by and extending from the engine 24. The shaft driving the drive pulley 100 is therefore generally referred to as the driving shaft. Although the present embodiment is being described with the crankshaft 25 being the driving shaft, it should be understood that other shafts are contemplated. Similarly, it is contemplated that the driven pulley 70 could be coupled to a shaft other than the transversely mounted jackshaft 72, such as directly to the drive axle 74 or any other shaft operatively connected to the propulsion element of the vehicle (i.e. the drive track 38 in the case of the snowmobile 10). The shaft driven by the driven pulley 70 is therefore generally referred to as the driven shaft. Although the present embodiment is being described with the transversely mounted jackshaft 72 being the driven shaft, it should be understood that other shafts are contemplated.

Turning now to FIGS. 3 to 9, the drive pulley 100 will be described in more detail. As discussed above, the drive pulley 100 includes a pair of opposed frustoconical belt drive sheaves 102 and 104. Both sheaves 102 and 104 rotate together with the crankshaft 25. The sheave 102 is fixed in an axial direction of the crankshaft 25, and is therefore referred to as the fixed sheave 102. The fixed sheave 102 is also rotationally fixed relative to the crankshaft 25. The sheave 104 can move toward or away from the fixed sheave 102 in the axial direction of the crankshaft 25 in order to change the drive ratio of the CVT 40, and is therefore referred to as the movable sheave 104. The movable sheave 104 is also rotationally fixed relative to the crankshaft 25 and the fixed sheave 102. As can be seen in FIG. 2, the fixed sheave 102 is disposed between the movable sheave 104 and the engine 24.

A ring gear 108 is mounted on a flange 110 (shown in FIG. 7) formed by the fixed sheave 102. The ring gear 108 is press-fitted on the flange 110 so as to be rotationally and axially fixed relative to the fixed sheave 102. The ring gear 108 is selectively engaged by a gear of a starter motor (not shown) of the engine 24. To start the engine 24, the starter motor engages the ring gear 108, which causes the fixed sheave 102, and the entire drive pulley 100, to turn. Since the fixed sheave 102 is rotational fixed relative to the crankshaft 25, the crankshaft 25 turns with the fixed sheave 102 which causes the movement of the pistons (not shown) of the engine 24 necessary to initiate the first combustion cycles needed to start the engine 24. Once the engine 24 has started, the gear of the starter motor disengages the ring gear 108 and the drive pulley 100 is turned by the engine 24 via the crankshaft 25. It is contemplated that the fixed sheave 102 could have the ring gear 108 fastened thereonto.

The fixed sheave 102 is mounted on a shaft 114. The fixed sheave 102 is press-fitted on the shaft 114 such that the fixed sheave 102 rotates with the shaft 114, and therefore rotates with the crankshaft 25. A raised portion 115 of the shaft 114 is knurled to increase the strength of the press-fit connection between the fixed sheave 102 and the shaft 114. It is contemplated that the fixed sheave 102 could be connected to the shaft 114 in other known manners to make the fixed sheave 102 rotationally and axially fixed relative to the shaft 114.

A portion 116 of the shaft 114 is taper-fitted on the end of the crankshaft 25 such that the shaft 114 and the fixed sheave 102 rotate with the crankshaft 25. It is contemplated that the shaft 114 could be connected to the crankshaft 25 in other known manners. For example, the shaft 114 could engage the crankshaft 25 via splines. A bolt 118 inserted inside the shaft 114 is screwed inside the end of the crankshaft 25, thus retaining the shaft 114, and therefore the fixed sheave 102, on the crankshaft 25.

A shaft 120 is disposed around the shaft 114. Ball bearings 122 are disposed in axially extending grooves 124, 126 in the outer surface of the shaft 114 and the inner surface of the shaft 120 respectively. The shaft 114, the shaft 120 and the ball bearings 122 together form a ball spline assembly. The ball bearings 122 transfer torque from the shaft 114 to the shaft 120 such that the shaft 120 rotates with the shaft 114 while permitting axial movement of the shaft 120 relative to the shaft 114. The shaft 120 is therefore rotationally fixed relative to the shaft 114. A retaining ring 128 disposed on the shaft 114 limits the movement of the ball bearings 122 inside the grooves 124, 126. The movable sheave 104 is mounted on the shaft 120.

The movable sheave 104 is press-fitted on the shaft 120 such that the movable sheave 104 rotates and moves axially with the shaft 120, and therefore rotates with the shaft 114 and the crankshaft 25. A raised portion 129 of the shaft 120 is knurled to increase the strength of the press-fit connection between the movable sheave 104 and the shaft 120. It is contemplated that the movable sheave 104 could be connected to the shaft 120 in other known manners to make the movable sheave 104 rotationally and axially fixed relative to the shaft 120.

A housing 130 is mounted on the end of the shaft 114 such that the movable sheave 104 is disposed axially between the housing 130 and the fixed sheave 102. The housing 130 includes a spider 132 and a cap 134. The spider 132 has three arms 136 and is disposed around the shaft 120. The cap 134 has a flange 138 fastened to corresponding flanges 140 of the spider 132 by fasteners 142.

The cap 134 has internal splines 144 that engage external splines 146 of the shaft 114 located near the end thereof. As a result, the cap 134, and therefore the housing 130, is rotationally fixed relative to the shaft 114 and will turn together with the shaft 114, the fixed sheave 102, the shaft 120 and the movable sheave 104. As would be understood, external and internal splines are a plurality of keys and keyways. As such it is contemplated that the splines could be replaced by a key engaging a keyway. It is contemplated that other ways of connecting the cap 134 to the shaft 114 such that the cap 134 is rotationally fixed relative to the shaft 114 could be used. For example, the shaft 114 could have a flat side and the cap 134 could have a corresponding flat side. In another example, the end of the shaft 114 could have a polygonal cross-section with an opening in the cap 134 having a corresponding polygonal cross-section. In yet another example, the cap 134 could be fastened to the shaft 114. The cap 134 is held axially between a tapered portion 148 of the shaft 114 and a washer 150. The washer 150 is held between the head 152 of the bolt 118 and the end of the shaft 114. As a result, the cap 134, and therefore the housing 130, is axially fixed relative to the shaft 114 and the fixed sheave 102.

A seal assembly 154 is disposed radially between the cap 134 and the shaft 114 at the end of the shaft 114. Two seals 156, 158 are disposed radially between the shaft 114 and the shaft 120 and axially between the ball bearings 122 and the fixed sheave 102. A seal 160 is disposed radially between an inner sleeve 162 of the cap 134 and the shaft 120 and axially between the ball bearings 122 and the end of the shaft 120 (the right end of the shaft 120 in FIG. 7). The cavity defined axially between the seals 158 and 160 and radially between the shaft 114, the inner sleeve 162, and the shaft 120 is filled at least in part with lubricant. The ball bearings 122 are located inside this cavity. In one embodiment, the lubricant used is a grease such as Klüber Isoflex Topas NB 52 or Klüber Isoflex Topas NB 152. However, it is contemplated that other types of lubricants could be used. The seals 156, 158 and 160 prevent lubricant from leaking out of the cavity. The seal assembly 154 prevents lubricant from leaking out of the cavity by passing between the inner sleeve 162 and the shaft 114.

Figure 11:
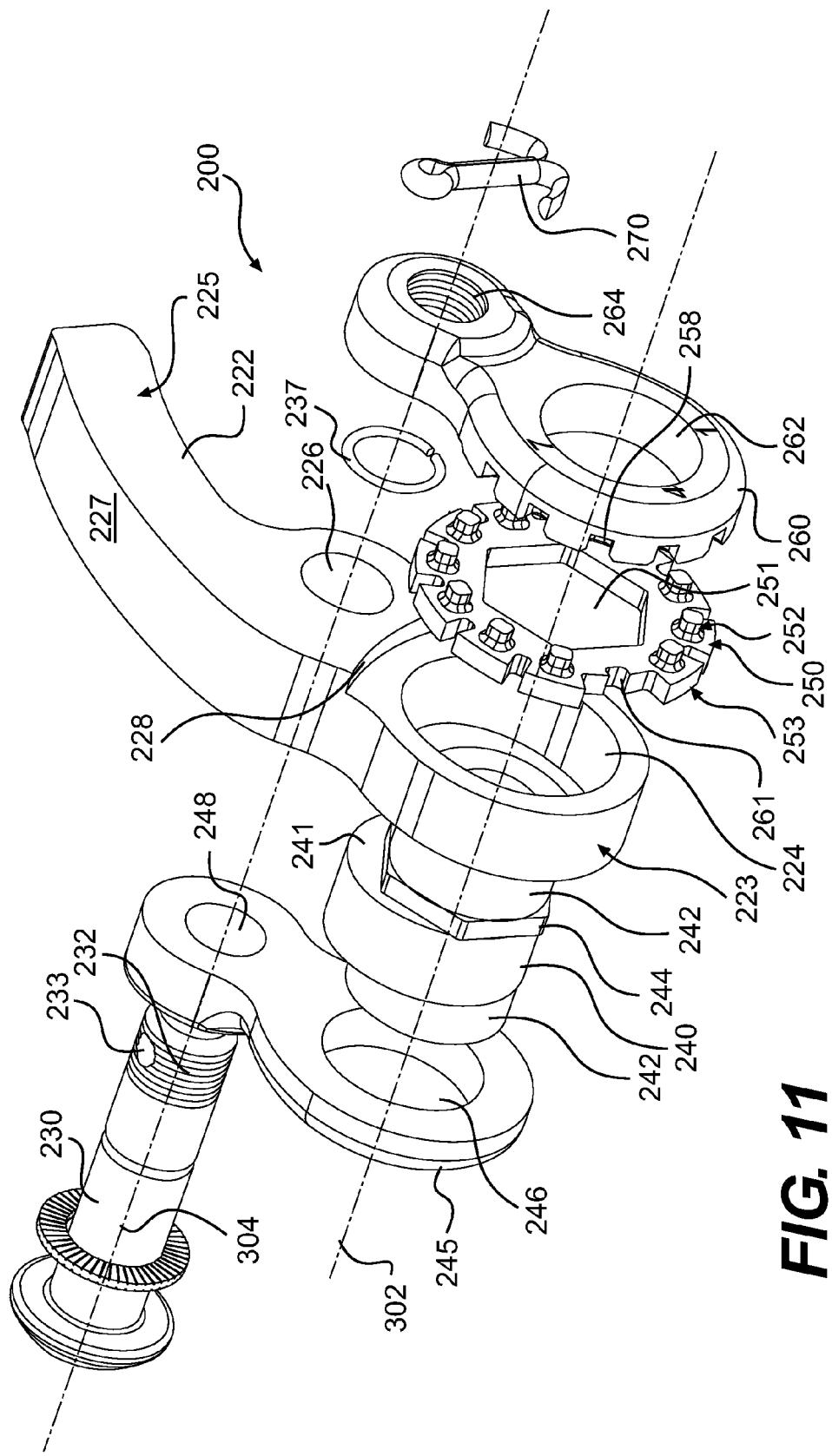
FIG. 11 is an exploded view of a first embodiment of a centrifugal actuator for the drive pulley of FIG. 3.

A coil spring 164 is disposed in a cavity 166 (shown in FIG. 7) defined between the shaft 120 and the housing 130. At one end, the spring 164 abuts a flange 168 (shown in FIG. 7) extending inwardly from the spider 132. As a result, this end of the spring 164 remains axially fixed when the movable sheave 104 and the shaft 120 move axially. At the opposite end, the spring 164 abuts a spring seat 170. The spring seat 170 is held in place on the end of the shaft 120 by the spring 164 and a C-clip 172. As a result, this end of the spring 164 moves axially when the movable sheave 104 and the shaft 120 move axially. As the movable sheave 104 and the shaft 120 move axially toward the fixed sheave 102, the spring 164 gets compressed as can be seen in FIG. 11. The spring 164 biases the movable sheave 104 and the shaft 120 away from the fixed sheave 102 toward their position shown in FIG. 7. It is contemplated that the movable sheave 104 could be biased away from the fixed sheave 102 by mechanisms other than the spring 164. For example, an air or hydraulic chamber or bevel washers could be used.

Figure 10:
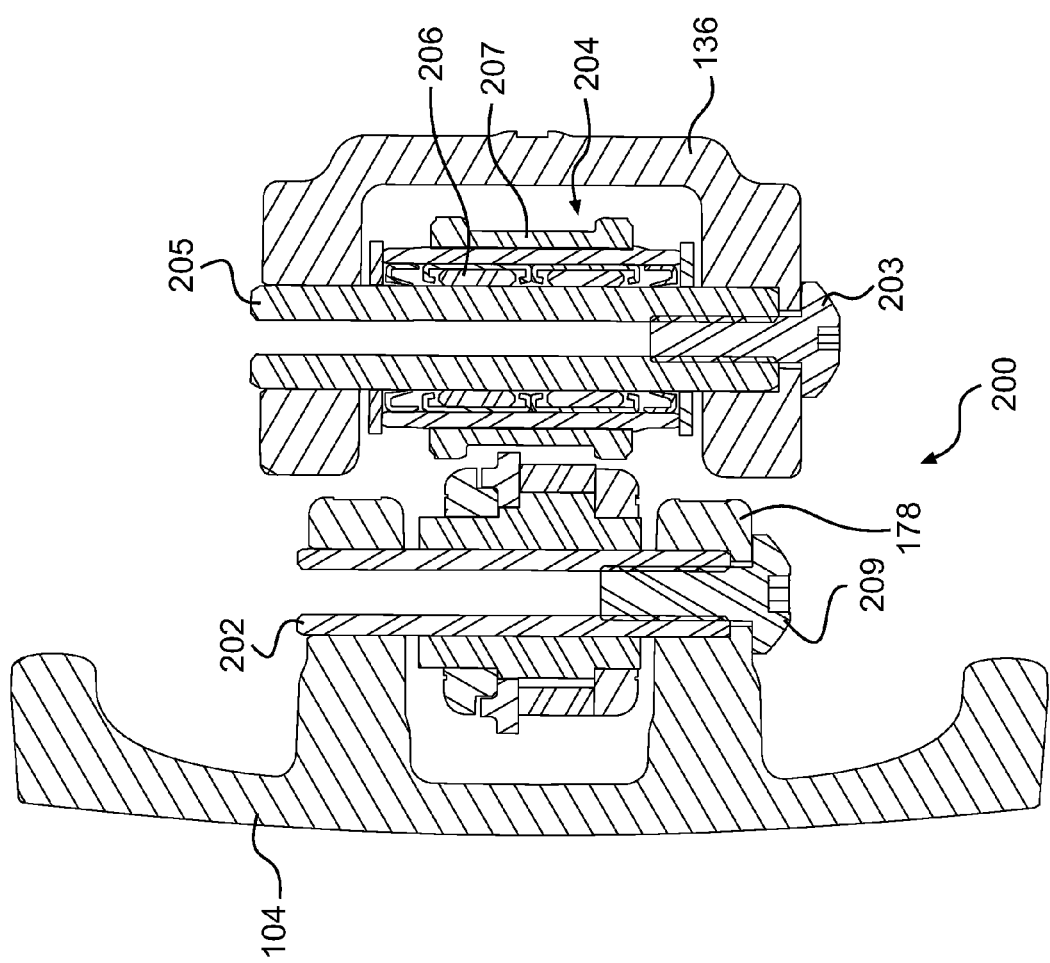
FIG. 10 is a cross-sectional view of the drive pulley of FIG. 3 taken through line 10-10 of FIG. 9.

Three rollers 204 pivotally connected to the three arms 136 of the spider 132. As shown in FIG. 10, each roller 204 is disposed around an axle 205. The axle 205 is inserted into apertures in the arm 136. A threaded fastener 203 fastens the axle 205 to the arm 136. The roller 204 has an inner body 206 around which a sleeve 207 is disposed.

The three centrifugal actuators 200 are pivotally connected to three brackets 178 formed by the movable sheave 104. Each roller 204 is aligned with a corresponding one of the centrifugal actuators 200. Since the housing 130 and the movable sheave 104 are rotationally fixed relative to the shaft 114, the rollers 204 remain aligned with their corresponding centrifugal actuators 200 when the shaft 114 rotates. It is contemplated that the rollers 204 could be pivotally connected to the brackets 178 and that the centrifugal actuators 200 could be connected to the arms 136 of the spider 132. It is also contemplated that there could be more or less than three centrifugal actuators 200, in which case there would be a corresponding number of arms 136, rollers 204 and brackets 178. It is also contemplated that the rollers 204 could be omitted and replaced with surfaces against which the centrifugal actuators 200 can slide as they pivot.

Referring more specifically to FIGS. 6 to 9, an operation of the drive pulley 100 will be described. An adjustment of the centrifugal actuators 200 will be described further below.

Figure 6:
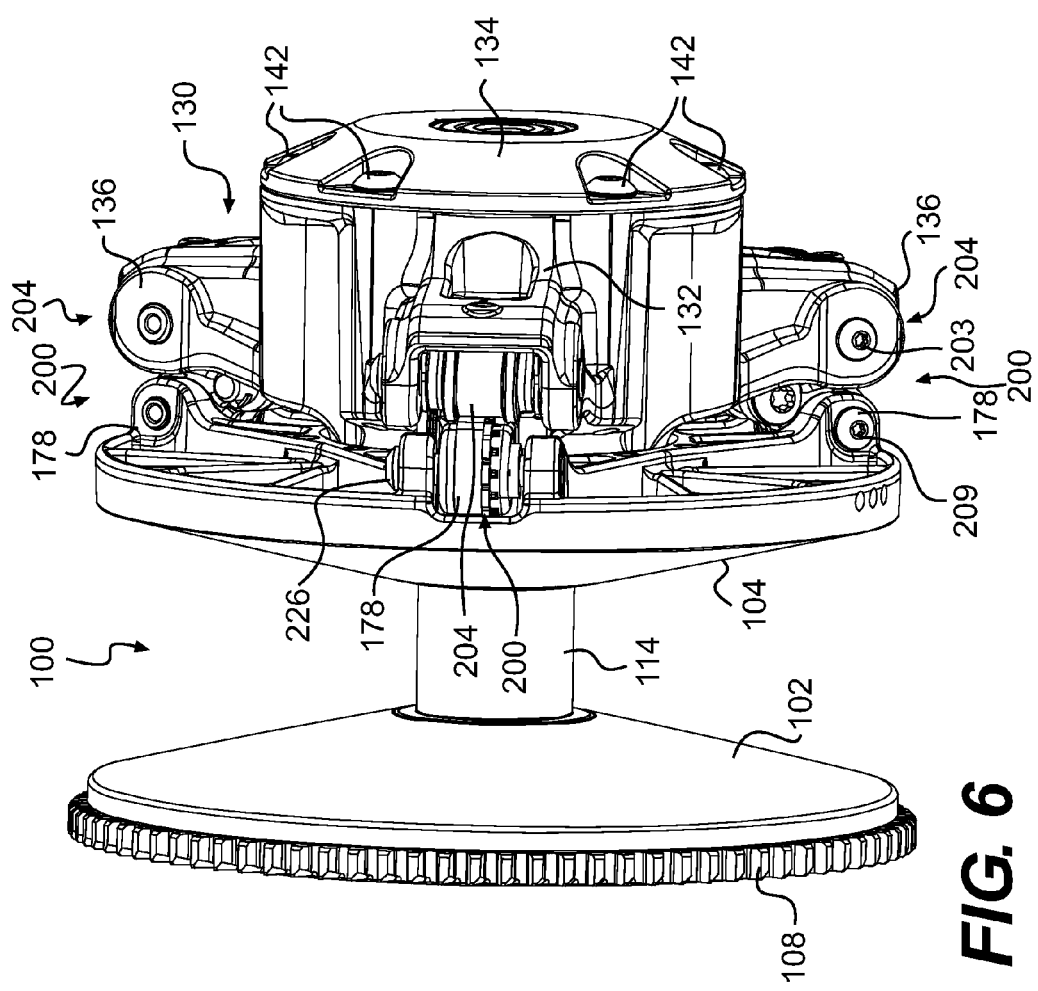
FIG. 6 is a front elevation view of the drive pulley of FIG. 3, with the drive pulley in an opened position.
Figure 7:
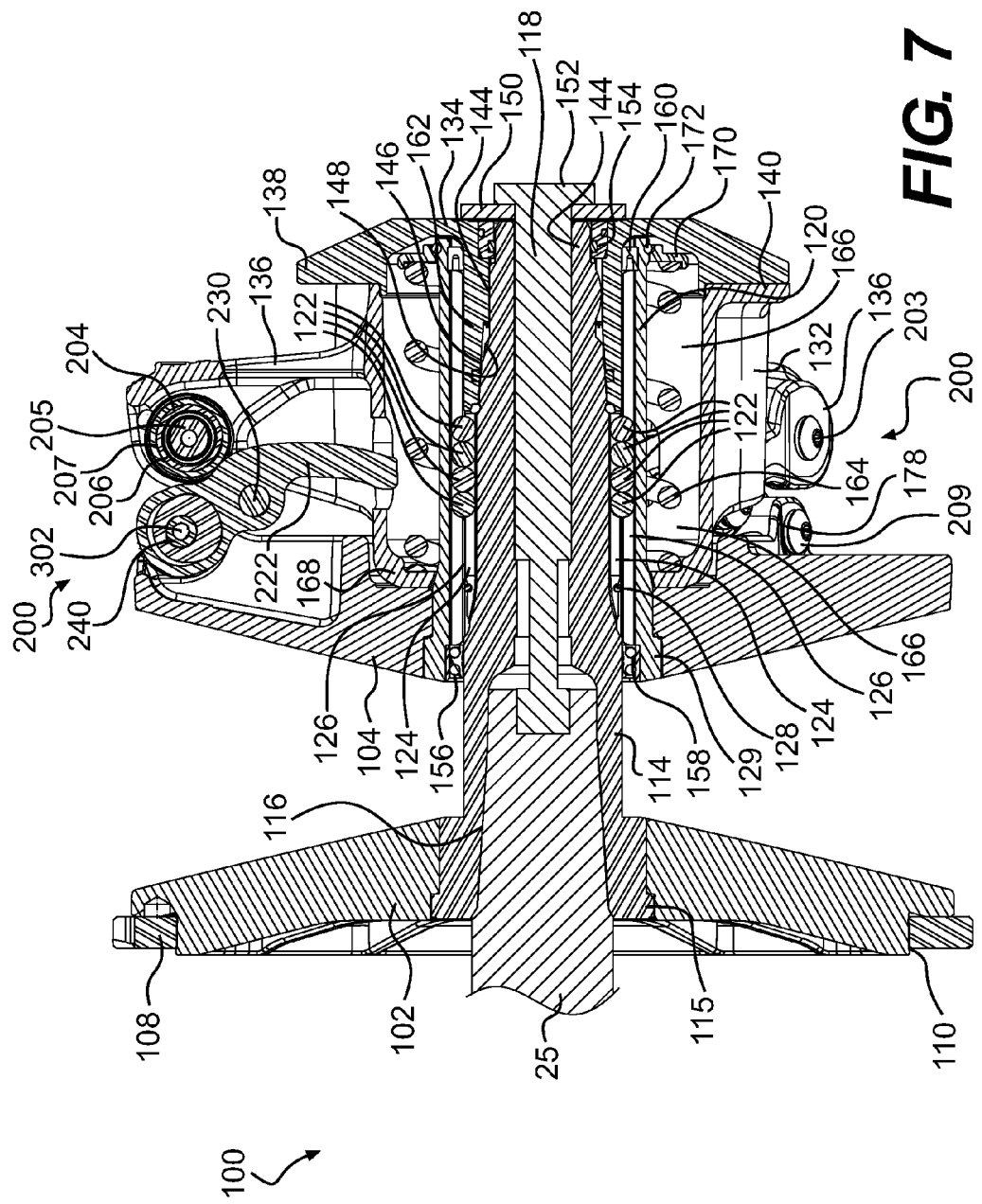
FIG. 7 is a cross-sectional view of the drive pulley of FIG. 3 taken through line 7-7 of FIG. 4, with the drive pulley in an opened position.
Figure 8:
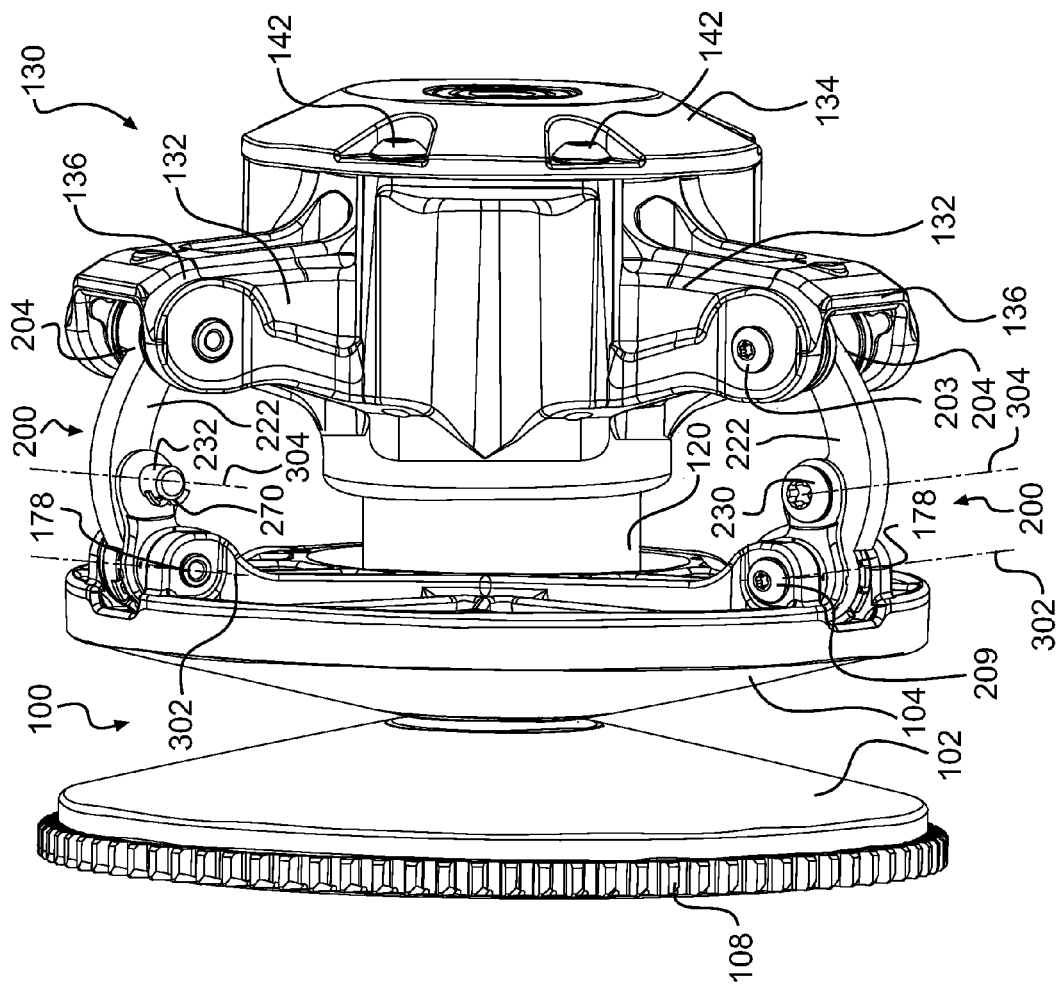
FIG. 8 is a front elevation view of the drive pulley of FIG. 3, with the drive pulley in a closed position.
Figure 9:
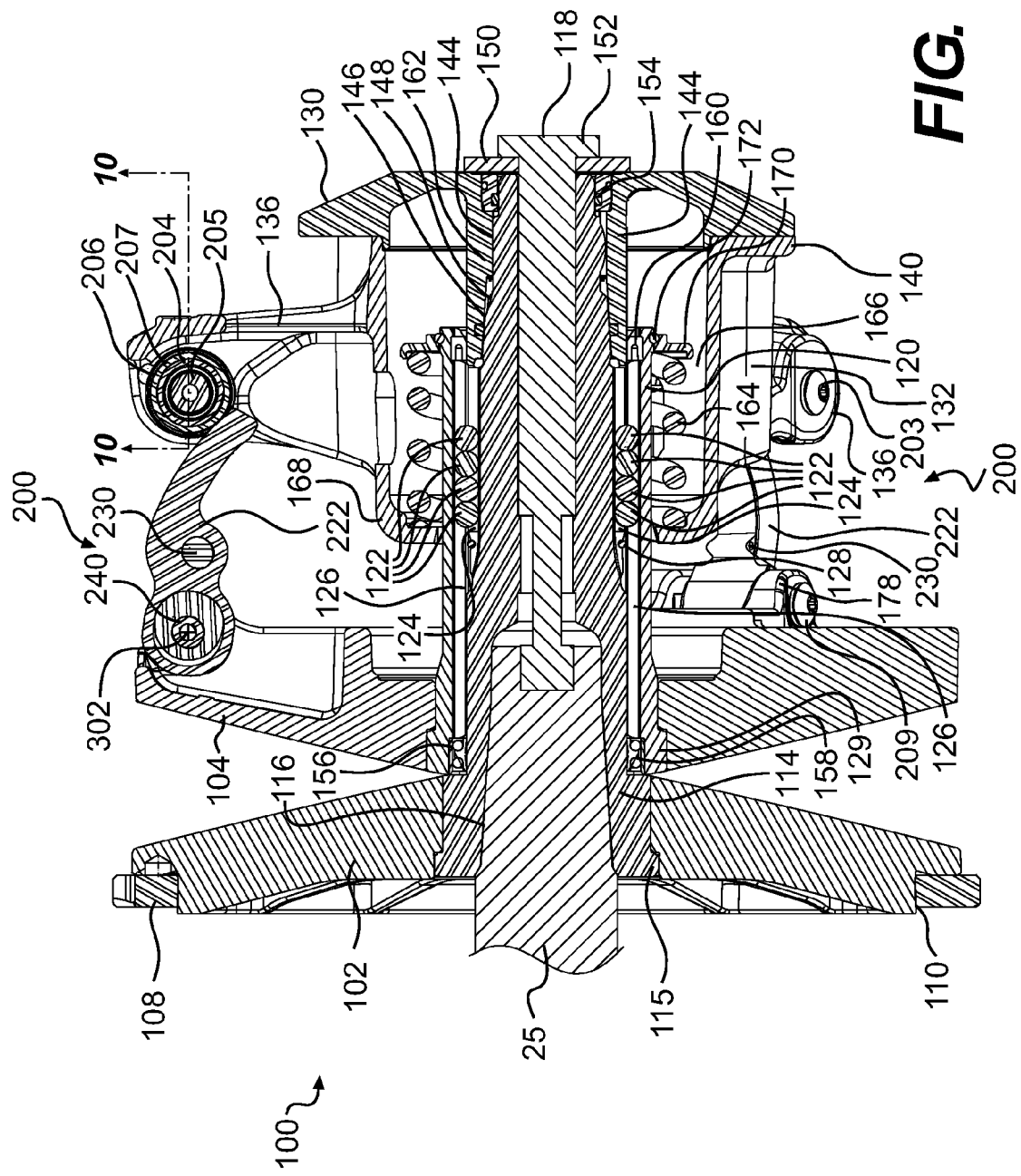
FIG. 9 is a cross-sectional view of the drive pulley of FIG. 3 taken through line 7-7 of FIG. 4, with the drive pulley in a closed position.

When the crankshaft 25 is not turning or is turning at low speeds, the drive pulley 100 is in the configuration shown in FIGS. 6 and 7. As the speed of rotation of the crankshaft 25 increases, the speed of rotation of the drive pulley 100 increases with it. As a result, the centrifugal actuators 200 pivot about an axis 302, thereby moving away from the shaft 114 and the shaft 120. As the centrifugal actuators 200 pivot, the arms 222 push against the rollers 204 to move the movable sheave 104 and the shaft 120 axially toward the fixed sheave 102. When the speed of rotation of the crankshaft 25 is high enough, the movable sheave 104 and the shaft 120 move to the position shown in FIGS. 8 and 9, which is as close as the movable sheave 104 can be to the fixed sheave 102. As the speed of rotation of the crankshaft 25 decreases, the arms 222 pivot about the axis 302 back toward the shaft 114 and the shaft 120 and the spring 164 moves the movable sheave 104 and the shaft 120 axially away from the fixed sheave 102.

Turning now to FIG. 11, a first embodiment of the centrifugal actuator 200 of the drive pulley 100 will be described. Each centrifugal actuator 200 comprises an arm 222, an eccentric 240, a fastener 230, a link 245, an indexing member 250, and a lock 260. The centrifugal actuators 200 are designed to adjust a position of the arm 222 with respect to the movable sheave 104 by pivoting it about an axis 304 that is offset from the axis 302 of rotation of the arms 222 described above. Each arm 222 is disposed around an axle 202. The axle 202 is inserted into apertures in the bracket 178. A threaded fastener 209 fastens the axle 202 to the bracket 178 in a manner similar to which the fastener 203 fastens the axle 205 to the arm 136.

The arm 222 has a head portion 223 and a tail portion 225 separated by a shoulder 228. The head portion 223 has a thickness smaller than the tail portion 225. The head portion 223 includes a first aperture 224 and the tail portion 225 includes a second aperture 226. The first aperture 224 is larger than the second aperture 226. The first aperture 224 is oblong. The tail portion 225 has a curved arm which defines a cam surface 227. The cam surface 227 is the surface in contact with the rollers 204 for pushing the movable sheave 104 away from the housing 130. A curvature of the cam surface 227 is designed using calculations, simulations and experiments to obtain a desired interaction between engine 24 rotation speed and movable sheave 104 movement.

The eccentric 240 is disposed around the axle 202. The eccentric 240 has a cam lobe 241 that is received in the oblong aperture 224 of the arm 222. As will be described below, a relative position of the cam lobe 241 with the arm 222 changes a position of the arm 222 for adjusting the centrifugal actuators 200. The cam lobe 241 is disposed between two cylindrical portions 242. A hexagonal portion 244 is disposed between the cam lobe 241 and one of the cylindrical portions 242. The cylindrical portions 242 mate with corresponding apertures 246, 248 of the link 245 and the lock 260 respectively. The hexagonal portion 244 mates with a hexagonal aperture 251 of the indexing member 250. It is contemplated that the indexing member 250 and the portion 244 could have a central aperture different from hexagonal. For example, the hexagonal aperture 251 and the portion 244 could be pentagonal. It is also contemplated that the portion 244 and the indexing member 250 could have a shape different from each other as long as the indexing member 250 is not rotating relative to the portion 244.

The indexing member 250 has a plurality of radially extending teeth 253. The teeth 253 are equidistant from each other, except for one missing tooth which forms a gap 261. The gap 261, as will be described below, helps to identify a position of the arm 222 when adjusting the centrifugal actuator 200. Although the indexing member 250 is shown herein as being separate from the eccentric 240, it is contemplated that the indexing member 250 and the eccentric 240 could be a single piece. The indexing member 250 has a plurality of knobs 252 extending on one face only of the indexing member 250.

The lock 260 has a first aperture 262 larger than a second aperture 264. The first aperture 262 receives the cylindrical portion 242 of the eccentric 240 proximate to the hexagonal portion 244. The lock 260 has a plurality of recesses 258 that mate with the plurality of knobs 252 of the indexing member 250.

The link 245 has two apertures 246, 248. The aperture 246 is larger than aperture 248. The aperture 246 receives the portion of the cylindrical portion 242 distal from the hexagonal portion 244.

The fastener 230 is inserted into the aperture 248 of the link 245, the aperture 226 of the arm 222 and the aperture 264 of the lock 260 so as to tighten the indexing member 250, the eccentric 240 and the link 245 together with the arm 222. The fastener has a threaded end 232 which threads with the aperture 264 of the lock 260. The threaded end 232 has an aperture 233 which receives a cotter pin 270 so as to secure the link 245 with the arm 222 and the lock 260 together. It is contemplated that the fastener 230 could tighten the indexing member 250, the eccentric 240 and the link 245 together by way other than using the threaded end 232. For example, the aperture 264 could not be threaded and a nut would be engaged with the threaded end 232 of the fastener 230 to tighten the centrifugal actuator 200.

A C-clip 237 keeps the fastener 230 from exiting the arm 222 when the fastener 230 is unscrewed. The C-clip 237 is stretched over the fastener 230 and the friction and elasticity of the C-clip 237 keeps it from rotating on the fastener 230 or sliding away from it. It is contemplated that the C-clip 237 could be omitted or could be replaced by another mechanism for preventing the fastener 230 from exiting the arm 222 when the fastener 230 is unscrewed during adjustment. It is contemplated that the C-clip could be replaced by an O-ring.

Figure 12:
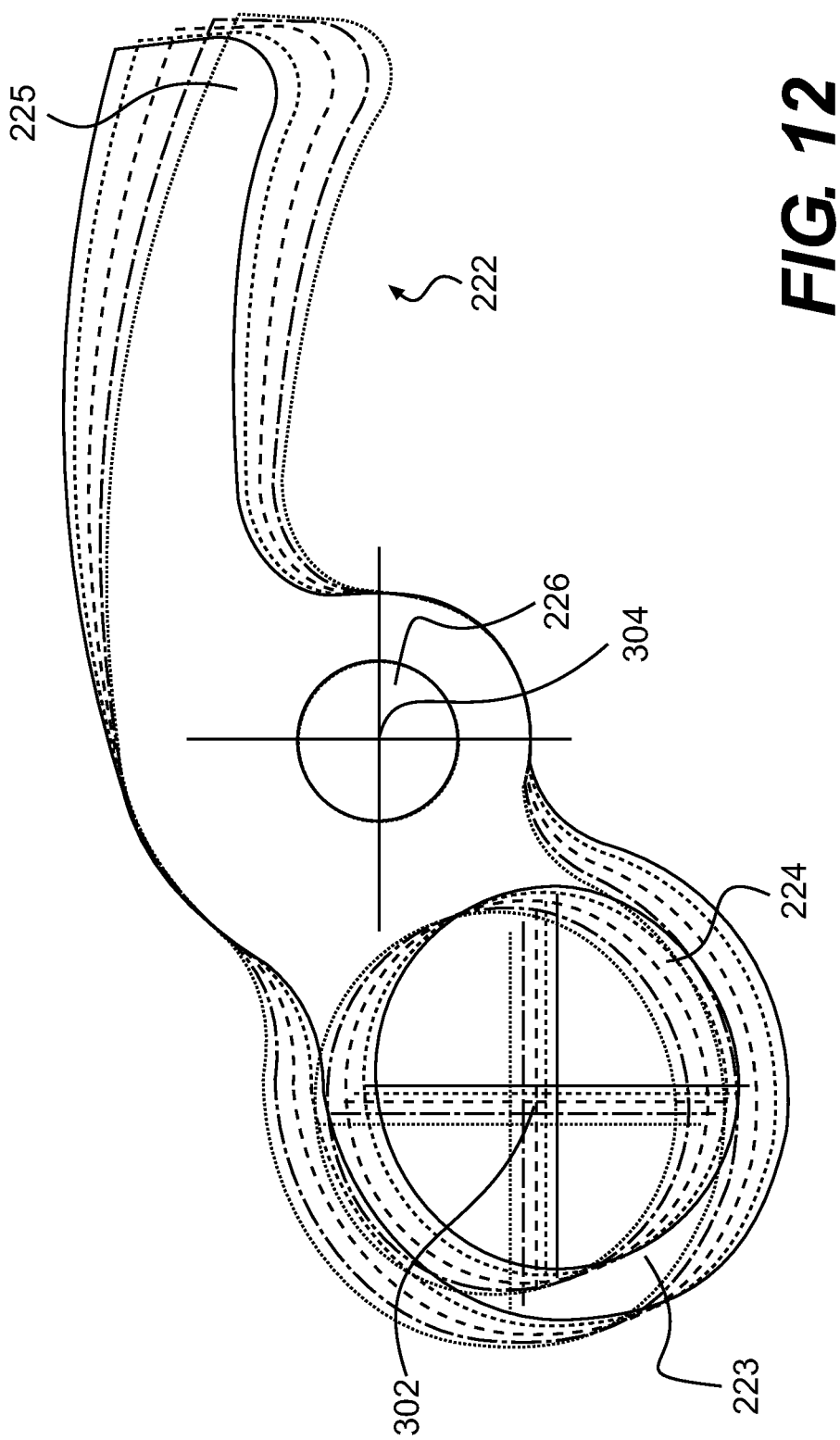
FIG. 12 is a front elevation view of an arm of the centrifugal actuator of FIG. 11 shown in five different positions.
Figure 13A:
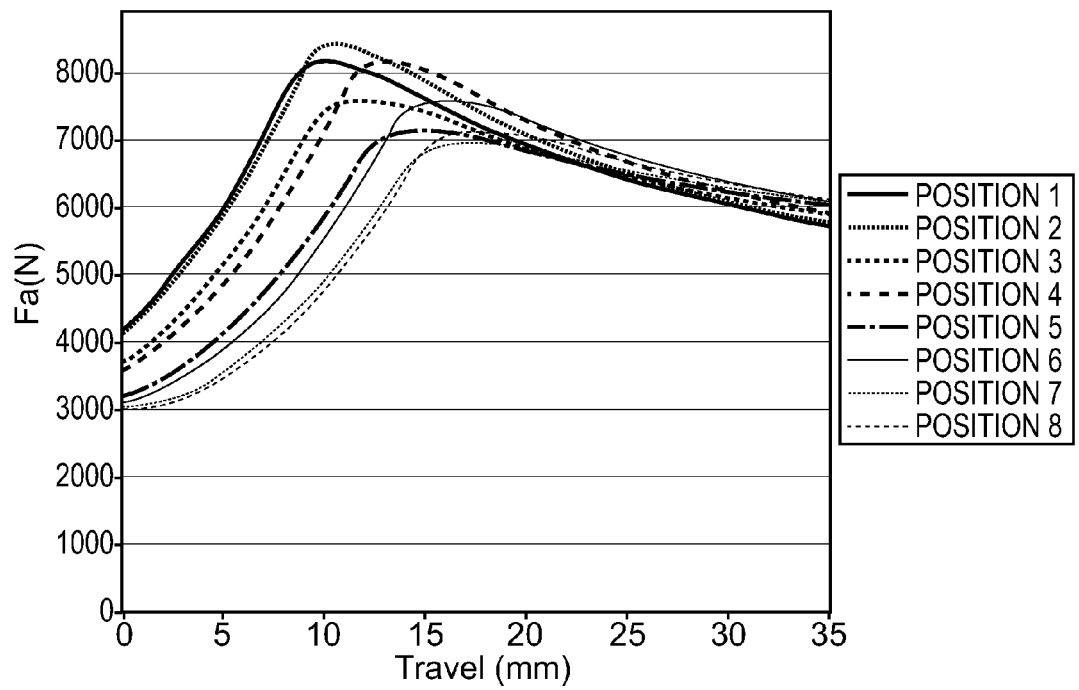
FIG. 13A is a graph of a centrifugal force versus travel distance of a moveable sheave with a prior art centrifugal actuator.
Figure 13B:
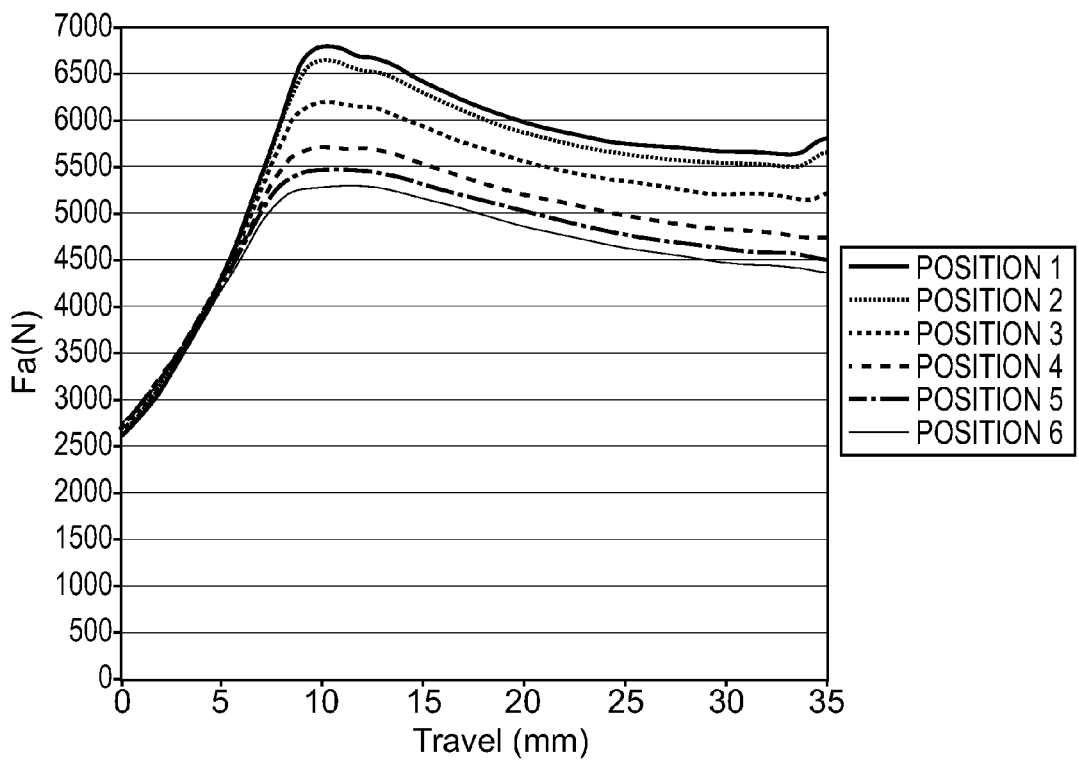
FIG. 13B is a graph of a centrifugal force versus travel distance of a moveable sheave with the centrifugal actuator of FIG. 11.

Referring now to FIGS. 12 and 13B, an adjustment of the centrifugal actuator 200 will be described.

When the user desires to adjust the centrifugal actuator 200, the user partially unthreads the fastener 230 from the lock 260 so as to create space between the indexing member 250 and the lock 260. Once enough space is made so that the knobs 252 are disengaged from the recesses 258, the user rotates the indexing member 250 to a desired position by using his/her fingers or an appropriate tool.

By moving the indexing member 250, the cam lobe 241 is rotated about the axis 302. The aperture 224 being oblong and the arm 222 being prevented to rotated about the axis 302 by the fastener 230, the motion of the cam lobe 241 forces the arm 222 to change position by rotating about the axis 304. When the arm 222 is rotated about the axis 304, the cam surface 227 is positioned differently with respect to the rollers 204, and as a result, the force profile of the centrifugal actuator 200 is modified.

Different positions of the arm 222 about the axis 304 are illustrated in FIG. 12. The indexing member 250 being engaged in the lock 260 by the knobs 252, the positions of the arm 222 are predetermined by the different positions of the knobs 252 and their mating recesses 258 in the lock 260. As a result, a number of positions of the cam lobe 241 relative to the arm 222 is discrete. It is contemplated however, that the actuator 200 could be designed so as to provide a continuous number of positions of the arm 222. A first position of the cam lobe 241 (solid lines) results in a first position of the arm 222 (solid lines), a second position of the cam lobe 241 (dotted lines) results in a second position of the arm 222 (dotted lines), a third position of the cam lobe 241 (dash-dotted lines) results in a third position of the arm 222 (dash-dotted lines), etc. The arm 222 has been rotated about the axis 304 by rotating the cam lobe 241 about the axis 302.

In the embodiments shown in the Figures, the axis 304 passes through a center of gravity of the centrifugal actuator 200. As a result, the engagement speed of the drive belt 76 is almost constant whatever the selected position of the arm 222 may be. As mentioned above, different forces are needed to initiate the movement of the moveable sheave 104 when the arm 222 is at different positions. In turn, the drive pulley 100 has to be rotated at a higher speed (engine revolution per minute (RPM)) to initiate the movement of the moveable sheave 104 and engage the drive belt 76. The engine RPM at which initial engagement occurs between drive pulley sheaves 102, 104 and the drive belt 76 is often referred to as the engagement RPM and corresponds to a position when movement of the snowmobile 10 is initiated (not taking into consideration friction and drive belt 76 slippage). FIGS. 13A and 13B display a centrifugal force (Fa) generated by the centrifugal actuator 200 (in Newton) with respect to Travel (in mm) of the movable sheave 104. Following a particular force profile to its intersection of the Force axis, zero travel corresponds to the engagement RPM. As shown in FIG. 13A, for a typical prior art actuator such as the one described in U.S. Pat. No. 5,326,330, the engagement RPM changes with the different positions of the arm 222. As shown in FIG. 13B, for the actuator 200 however, the engagement RPM is almost identical for the different predetermined positions of the arm 222. In the actuator 200, the engagement RPM is almost identical, because the arm 222 is being adjusted by pivoting it about the center of gravity of the centrifugal actuator 200 (i.e. axis 304 passes through the center of gravity of the centrifugal actuator 200). It is contemplated that the axis 304 could not pass through the center of gravity of the centrifugal actuator 200 and that the engagement speed of the drive belt 76 would be different for different settings of the centrifugal actuator 200.

It should be understood that in some situation, having a different engagement RPM for different conditions could be desirable and that the arm 222 could be pivoted about an axis offset from the center of gravity of the centrifugal actuator 200.

The gap 261 of the indexing member 250 allows the user to monitor the position of the cam lobe 241. To adjust the arms 222 toward a different position to obtain a different force profile, the user rotates the indexing member 250 clockwise or counterclockwise to have the gap 261 in front of another number indicated on the lock 260. For example, a number 4 (shown in FIG. 11) can be a recommended adjustment for the snowmobile 10 operating at sea level, and a number 6 can be a recommended adjustment for the snowmobile 10 operating at higher altitudes.

Once the adjustment is made, the user tightens the fastener 230 in the lock 260 and repeats the operation for all the remaining assemblies.

Figure 14:
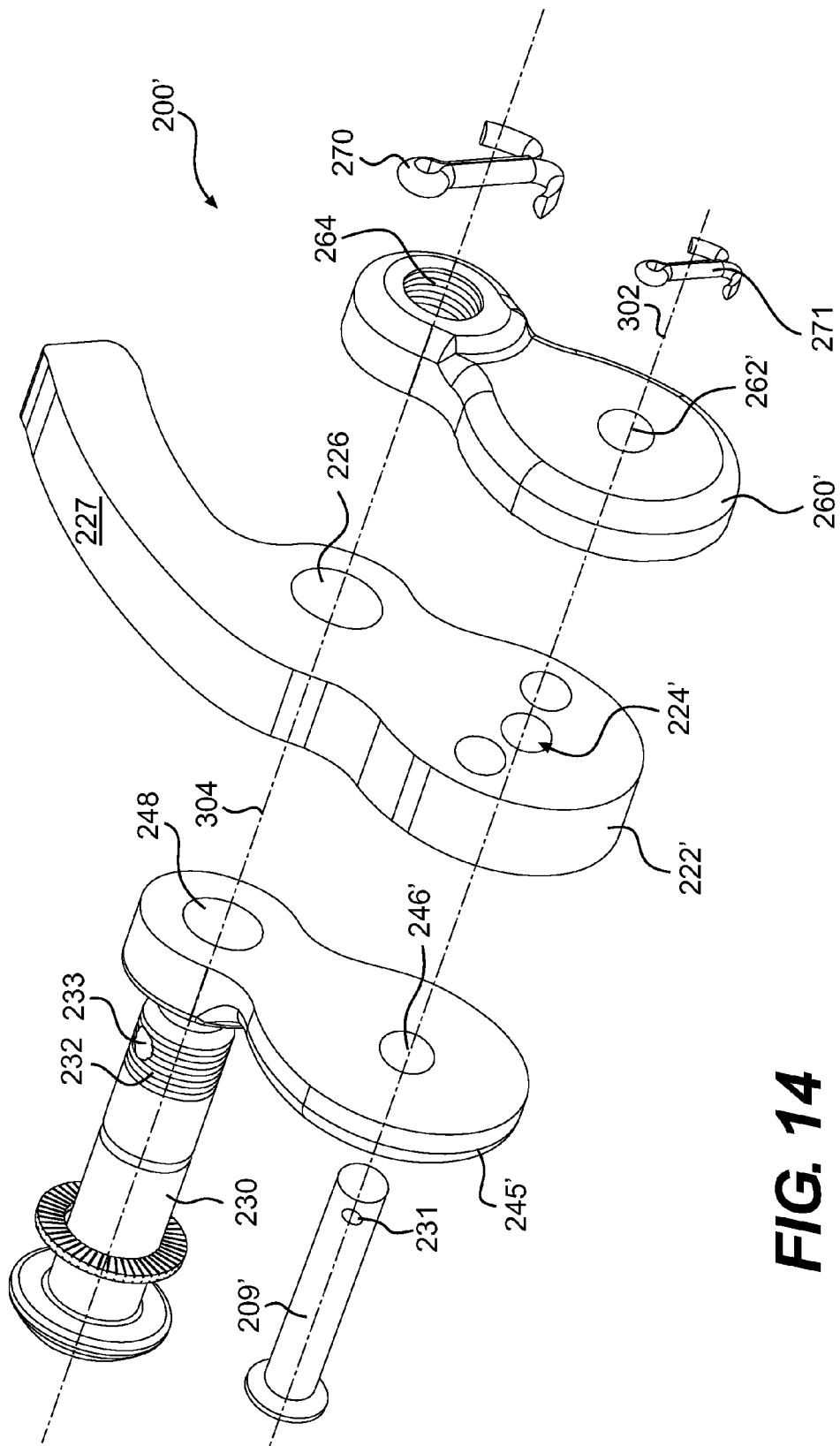
FIG. 14 an exploded view of a second embodiment of a centrifugal actuator for the drive pulley of FIG. 3.

Turning now to FIG. 14, a second embodiment of the centrifugal actuators 200' of the drive pulley 100 will be described. Elements common between the centrifugal actuators 200 and the centrifugal actuators 200' have same reference numerals and will not be described in details again.

Each of the centrifugal actuators 200' is connected to its corresponding bracket 178 of the movable sheave 104 by a fastener 209'. The fastener 209' extends through the bracket 178 and is held in place by a cotter pin 271. It is contemplated that the centrifugal actuators 200' could be connected to the movable sheave 104 by way other than with the fastener 209' and the cotter pin 271. For example, the fastener 209' and the cotter pin 271 could be replaced by a fastener and sleeve assembly similar to the fastener 209 and the axle 202.

Each centrifugal actuator 200' comprises an arm 222', the fastener 230, a link 245', and a lock 260'. The arm 222' is similar to the arm 222, but does not have the shoulder 228 and the aperture 224. The arm 222' incorporates an indexing system in the form of a series of apertures 224'. As will be described below, the series of apertures 224' are selectively engaged by the fastener 209' for positioning the arm 222 at different positions, thereby providing an alternative to the eccentric 240 and the indexing member 250. The apertures 224' are positioned so as to form an arc having a radius equal to the distance between axes 302 and 304. The position of the apertures 224' along the arc is determined along with the shape of the cam surface 227 to provide alternative force profiles from the single arm 222' as described above. It is contemplated that the arm 222' could have the shoulder 228. The arm 222' has the aperture 226, but has a series of apertures 224' instead of the oblong aperture 224. It is contemplated that the apertures 224' could be positioned differently depending on a shape of the cam surface 227. It is contemplated that the apertures 224' could be shaped differently than shown in the figures. It is also contemplated that the apertures 224' could be replaced by a single arcuate slot.

The link 245' is similar to the link 245 except that it has an aperture 246' shaped to receive the fastener 209', as opposed to the aperture 246 which is shaped to received one of the cylindrical portion 242 of the eccentric 240.

The lock 260' is similar to the lock 260 except that it has an aperture 262' shaped to receive the fastener 209', as opposed to the aperture 262 which is shaped to received another one of the cylindrical portion 242 of the eccentric 240. The lock 260' also does not have the recesses 258. The fastener 209' is connected to the lock 260' by a cotter pin 271 engageable in an aperture 231 of the fastener 209'. It is contemplated that the cotter pin 271 could be omitted and that the aperture 262' and the fastener 209' could be threaded. It is contemplated that the cotter pin 271 could be replaced by a nut threaded onto the fastener 209'.

To adjust a position of the arm 222', the user partially unscrews the fastener 230 from the lock 260' to create a little space between the arm 222, the lock 260 and the link 245'. The user then removes the cotter pin 271 from the aperture 231 of the fastener 209' and disengages the fastener 209' from the lock 260' and the arm 222'. The user pivots the arm 222' about the axis 304 to align another one of the apertures 224' which corresponds to a desired position of the arm 222' with the apertures 246', 262'. Where the arm 222' has a slot instead of the apertures 224', the user would not have to disengage the fastener 209' and would just pivot the arm 222 to the desired position. The centrifugal actuator 200' with a slot instead of the apertures 224' is an example of continuous adjustment positions of the arm 222'. Once the arm 222' is in the desired position, the user engages the fastener 209' with the arm 222', the link 245' and the lock 260', and re-inserts the cotter pin 271 in the aperture 231. The user then reengages the fastener 230 with the lock 260' and positions the cotter pin 270 in the aperture 233 of the fastener 230. By doing so, the user has in effect pivoted the arm 222' with respect to the axis 304, thereby modifying the force profile of the arm 222' as described above.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A drive pulley for a continuously variable transmission comprising:
    a fixed sheave;
    a movable sheave axially movable relative to the fixed sheave, the movable sheave being rotationally fixed relative to the fixed sheave; and
    at least one centrifugal actuator including an arm pivotally connected to one of the movable sheave and a portion of the drive pulley axially and rotationally fixed the fixed sheave at a first pivot axis, the arm pivoting away from the one of the movable sheave and the portion of the drive pulley about the first pivot axis as a speed of rotation of the drive pulley increases, the arm pushing against another one of the movable sheave and the portion of the drive pulley as the arm pivots away from the one of the movable sheave and the portion of the drive pulley, thereby moving the movable sheave axially toward the fixed sheave, the arm being movable relative to the first pivot axis by pivoting the arm about a second pivot axis, the second pivot axis being offset from the first pivot axis, the second pivot axis being parallel to the first pivot axis,
    the arm having a head portion and a tail portion, the first pivot axis passing through the head portion, the tail portion having a point therein remaining at a constant distance from the first pivot axis as the arm moves relative to the first pivot axis by pivoting the arm about the second pivot axis.

2. The drive pulley of claim 1, wherein the second pivot axis passes through the point.

3. The drive pulley of claim 1, wherein the at least one centrifugal actuator further includes an eccentric disposed in an aperture of the arm, the eccentric being pivotable about the first pivot axis relative to the arm.

4. The drive pulley of claim 1, wherein the arm includes a first aperture and a second aperture, the first pivot axis passes through the first aperture, and the second pivot axis passes through the second aperture.

5. The drive pulley of claim 4, wherein the first aperture is oblong and adapted to cooperate with an eccentric disposed in the first aperture, the eccentric being pivotable about the first pivot axis relative to the arm.

6. The drive pulley of claim 5, wherein the at least one centrifugal actuator further includes an indexing member connected to the eccentric, the indexing member controlling the pivoting of the arm about the second pivot axis by pivoting the eccentric about the first pivot axis.

7. The drive pulley of claim 6, wherein the at least one centrifugal actuator further includes a locking member, the locking member selectively preventing the eccentric from rotating relative to the arm.

8. The drive pulley of claim 7, further comprising a fastener securing the locking member, the indexing member and the arm together.

9. The drive pulley of claim 8, wherein the second pivot axis is disposed at a center of gravity of the at least one centrifugal actuator.

10. An arm for a centrifugal adjustment system of a drive pulley for a continuously variable transmission, the arm comprising:
    a body having a head portion, a tail portion and a shoulder separating the head portion form the tail portion, the tail portion defining a cam surface;
    a first aperture is disposed in the head portion, the first aperture being oblong; and
    a second aperture is disposed in the tail portion.

11. An arm for a centrifugal adjustment system of a drive pulley for a continuously variable transmission, the arm comprising:
    a body having a head portion, a tail portion and a shoulder separating the head portion from the tail portion, the head portion having a first thickness, the tail portion having a second thickness, and the first thickness being smaller than the second thickness;
    a first aperture is disposed in the head portion, the arm being adapted for pivoting about a first axis as a speed of rotation of the drive pulley increases, the first axis extending through the first aperture; and
    a second aperture is disposed in the tail portion, the second aperture defining a second axis, the second axis being parallel to the first axis,
    the first and second thicknesses being measured in a direction parallel to the axes.

12. The arm of claim 10, wherein the second aperture is smaller than the first aperture.

13. A drive pulley for a continuously variable transmission comprising:
    a fixed sheave;
    a movable sheave axially movable relative to the fixed sheave, the movable sheave being rotationally fixed relative to the fixed sheave;
    at least one centrifugal actuator including an arm pivotally connected to one of the movable sheave and a portion of the drive pulley axially and rotationally fixed to the fixed sheave at a first pivot axis, the arm having an associated cam surface; and
    at least one follower associated with the cam surface of the at least one centrifugal actuator, the at least one follower being connected to the other one of the movable sheave and the portion of the drive pulley, the arm of the at least one centrifugal actuator pivoting about the first pivot axis as a speed of rotation of the drive pulley increases, the cam surface of the at least one centrifugal actuator pushing against the at least one follower as the cam surface pivots about the first pivot axis thereby moving the movable sheave axially toward the fixed sheave, the arm of the at least one centrifugal actuator being movable relative to the first pivot axis by pivoting the arm about a second pivot axis, the second pivot axis being offset from the first pivot axis, the second pivot axis being parallel to the first pivot axis, the second pivot axis passing through a center of gravity of the at least one centrifugal actuator.

14. The drive pulley of claim 13, wherein the second pivot axis is disposed in the arm of the at least one centrifugal actuator.

15. The drive pulley of claim 13, wherein the at least one centrifugal actuator further includes an eccentric disposed in an aperture of the arm, the eccentric being pivotable about the first pivot axis relative to the arm.

16. The drive pulley of claim 13, wherein the portion of the drive pulley is a housing axially and rotationally fixed to the fixed sheave.

17. The drive pulley of claim 1, further comprising a link secured to the arm, the link having a first aperture and a second aperture; and
wherein the first pivot axis passes through the first aperture of the link and the second pivot axis passes through the second aperture of the link.

18. The drive pulley of claim 13, further comprising a link secured to the arm, the link having a first aperture and a second aperture; and
wherein the first pivot axis passes through the first aperture of the link and the second pivot axis passes through the second aperture of the link.

19. A drive pulley for a continuously variable transmission comprising:
a fixed sheave;
a movable sheave axially movable relative to the fixed sheave, the movable sheave being rotationally fixed relative to the fixed sheave; and
at least one centrifugal actuator including an arm pivotally connected to one of the movable sheave and a portion of the drive pulley axially and rotationally fixed to the fixed sheave at a first pivot axis, the arm pivoting away from the one of the movable sheave and the portion of the drive pulley about the first pivot axis as a speed of rotation of the drive pulley increases, the arm pushing against another one of the movable sheave and the portion of the drive pulley as the arm pivots away from the one of the movable sheave and the portion of the drive pulley, thereby moving the movable sheave axially toward the fixed sheave, the arm being movable relative to the first pivot axis by pivoting the arm about a second pivot axis, the second pivot axis being offset from the first pivot axis, the second pivot axis being parallel to the first pivot axis,
the arm including a first aperture and a second aperture, the first pivot axis passing through the first aperture, and the second pivot axis passing through the second aperture.

20. The drive pulley of claim 19, wherein the second pivot axis is disposed in the arm.

21. The drive pulley of claim 19, wherein the at least one centrifugal actuator further includes an eccentric disposed in the first aperture of the arm, the eccentric being pivotable about the first pivot axis relative to the arm.

22. A drive pulley for a continuously variable transmission comprising:
a fixed sheave;
a movable sheave axially movable relative to the fixed sheave, the movable sheave being rotationally fixed relative to the fixed sheave;
a housing axially and rotationally fixed relative to the fixed sheave; and
at least one centrifugal actuator including:
an arm including a head portion having a first aperture and a tail portion having a second aperture, the head portion being pivotally connected to one of the movable sheave and the housing about a first pivot axis passing through the first aperture, the arm pivoting away from the one of the movable sheave and the housing about the first pivot axis as a speed of rotation of the drive pulley increases, the arm pushing against another one of the movable sheave and the housing as the arm pivots away from the one of the movable sheave and the housing, thereby moving the movable sheave axially toward the fixed sheave, the arm being movable relative to the first pivot axis by pivoting the arm about a second pivot axis; and
a link including a first aperture and a second aperture,
the first pivot axis passing through the first aperture of the link, and
the second pivot axis passing through the second aperture of the arm and the second aperture of the link.

23. The drive pulley of claim 22, wherein the at least one centrifugal actuator further includes an eccentric disposed in the first aperture of the arm, the eccentric being pivotable about the first pivot axis relative to the arm.

24. The drive pulley of claim 1, wherein the portion of the drive pulley is a housing axially and rotationally fixed relative to the fixed sheave, the movable sheave being disposed axially between the housing and the fixed sheave.

25. The drive pulley of claim 1, further comprising a biasing member biasing the movable sheave axially away from the fixed sheave.

26. The drive pulley of claim 13, further comprising a biasing member biasing the movable sheave axially away from the fixed sheave.

27. The drive pulley of claim 19, wherein the portion of the drive pulley is a housing axially and rotationally fixed relative to the fixed sheave.

28. The drive pulley of claim 21, wherein the first aperture is oblong.

29. The drive pulley of claim 19, wherein the second pivot axis is spaced from a center of gravity of the at least one centrifugal actuator.

30. The drive pulley of claim 19, wherein a center of gravity of the at least one centrifugal actuator is disposed in the second aperture.

31. A drive pulley for a continuously variable transmission comprising:
a fixed sheave;
a movable sheave axially movable relative to the fixed sheave, the movable sheave being rotationally fixed relative to the fixed sheave; and
at least one centrifugal actuator including:
an arm including a head portion having a first aperture and a tail portion having a second aperture, the head portion being pivotally connected to one of the movable sheave and a portion of the drive pulley axially and rotationally fixed to the fixed sheave about a first pivot axis passing through the first aperture, the arm pivoting away from the one of the movable sheave and the portion of the drive pulley about the first pivot axis as a speed of rotation of the drive pulley increases, the arm pushing against another one of the movable sheave and the portion of the drive pulley as the arm pivots away from the one of the movable sheave and the portion of the drive pulley, thereby moving the movable sheave axially toward the fixed sheave, the arm being movable relative to the first pivot axis by pivoting the arm about a second pivot axis; and a link including a first aperture and a second aperture, the first pivot axis passing through the first aperture of the link, and the second pivot axis passing through the second aperture of the arm and the second aperture of the link.

32. The drive pulley of claim 31, wherein the at least one centrifugal actuator further includes an eccentric disposed in the first aperture, the eccentric being pivotable about the first pivot axis relative to the head portion.

33. A drive pulley for a continuously variable transmission comprising:

a fixed sheave;

a movable sheave axially movable relative to the fixed sheave, the movable sheave being rotationally fixed relative to the fixed sheave; and at least one centrifugal actuator including an arm pivotally connected to one of the movable sheave and a portion of the drive pulley axially and rotationally fixed the fixed sheave at a first pivot axis, the arm pivoting away from the one of the movable sheave and the portion of the drive pulley about the first pivot axis as a speed of rotation of the drive pulley increases, the arm pushing against another one of the movable sheave and the portion of the drive pulley as the arm pivots away from the one of the movable sheave and the portion of the drive pulley, thereby moving the movable sheave axially toward the fixed sheave, the arm being movable relative to the first pivot axis by pivoting the arm about a second pivot axis, the second pivot axis being offset from the first pivot axis, the second pivot axis being parallel to the first pivot axis, the arm having a head portion and a tail portion, the first pivot axis passing through the head portion, the second pivot axis being disposed between the first pivot axis and an end of the tail portion in any position of the arm relative to the first pivot axis.

* * * * *

UNITED STATES PATENT AND TRADEMARK OFFICE
CERTIFICATE OF CORRECTION

| | |
|---|---|
| PATENT NO. | : 9,267,580 B2 |
| APPLICATION NO. | : 14/241533 |
| DATED | : February 23, 2016 |
| INVENTOR(S) | : Xavier-Pierre Aitcin |

It is certified that error appears in the above-identified patent and that said Letters Patent is hereby corrected as shown below:

In the Claims:

Claim 1, Column 13, line 42, "rotationally fixed the fixed" should read -- rotationally fixed to the fixed --

Claim 10, Column 14, line 29, "portion form the tail portion" should read -- portion from the tail portion --

Claim 33, Column 18, line 3, "rotationally fixed the fixed" should read -- rotationally fixed to the fixed --

Signed and Sealed this
Seventeenth Day of May, 2016

Michelle K. Lee
*Director of the United States Patent and Trademark Office*